US006218329B1

(12) United States Patent
Singh et al.

(10) Patent No.: US 6,218,329 B1
(45) Date of Patent: *Apr. 17, 2001

(54) PROCESS FOR FORMING ALUMINO-SILICATE DERIVATIVES

(75) Inventors: Balbir Singh, St. Lucia; Ian Donald Richard Mackinnon, Ellengrove; David Page, Corinda, all of (AU)

(73) Assignee: The University of Queensland, Queensland (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,375

(22) PCT Filed: Oct. 23, 1995

(86) PCT No.: PCT/AU95/00699

§ 371 Date: Apr. 14, 1997

§ 102(e) Date: Apr. 14, 1997

(87) PCT Pub. No.: WO96/18577

PCT Pub. Date: Jun. 20, 1996

(30) Foreign Application Priority Data

Dec. 16, 1994 (AU) .................................................. PN0121

(51) Int. Cl.[7] .................................................... B01J 21/16
(52) U.S. Cl. ............................. 502/84; 502/60; 502/64; 502/80; 502/85; 502/86; 501/141; 423/328.1
(58) Field of Search ................. 502/60, 80, 85, 502/86, 64, 84; 106/486, 487; 501/141; 423/328.1

(56) References Cited

U.S. PATENT DOCUMENTS

| 3,140,251 | * | 7/1964 | Plank et al. ............................. 502/79 |
| 3,765,825 | * | 10/1973 | Hurst ....................................... 432/18 |
| 3,769,383 | * | 10/1973 | Hurst ....................................... 423/111 |
| 3,784,392 | * | 1/1974 | Bertorelli .............................. 106/468 |
| 3,837,877 | * | 9/1974 | Bertorelli .............................. 106/488 |
| 4,271,043 | * | 6/1981 | Vaughan et al. ........................ 502/84 |
| 5,171,365 | * | 12/1992 | Wason ................................... 106/632 |
| 5,192,725 | | 3/1993 | Holmgren . |
| 5,858,081 | * | 1/1999 | Thompson et al. ................... 106/486 |

FOREIGN PATENT DOCUMENTS

| 61818/86 | 8/1985 | (AU) . |
| 917630 | 12/1972 | (CA) . |
| 153879 | 9/1985 | (EP) . |
| 499887 | 3/1976 | (SU) . |
| 1588437 A1 | 8/1990 | (SU) . |
| 1771426 A3 | 10/1992 | (SU) . |
| WO 95/00441 | 1/1995 | (WO) . |

OTHER PUBLICATIONS

"Data Handbook for Clay Materials and Other Non–Metallic Minerals," H. van Olphen, Ed., Pergamon Press, pp. 19 & 22 (1979).

M.H. Battey, "Mineralogy for Students," Department of Geology, Univ. of Newcastle upon Tyne, Longman, Publ. p. 237 (Year Unknown).

* cited by examiner

*Primary Examiner*—Tom Dunn
(74) *Attorney, Agent, or Firm*—Akin, Gump, Strauss, Hauer & Feld L.L.P.

(57) ABSTRACT

A process for the preparation of an amorphous aluminosilicate derivative which involves reacting a solid corresponding starting material with MOH where M is alkali metal or ammonium cation. The solid corresponding starting material may be selected from montmorillonite, kaolin, natural zeolite (e.g., clinoliptolite/heulandite) as well as illite, palygorskite and saponite and additional reactant MX wherein X is halide may be utilized in conjunction with MOH. The invention also includes alumino-silicate derivatives of the general formula $M_p Al_q Si_2 O_r (OH)_s X_t \cdot uH_2O$ as well as alumino-silicate derivatives of the general formula $M_p Al_q Si_2 O_r (OH)_s \cdot uH_2O$.

14 Claims, 16 Drawing Sheets

STX-2

58.55
−1.90

350 300 250 200 150 100 50 0 −50 −100 −150 −200 −250 −300 −350
PPM

FIG. 3

PROCESS FOR FORMING ALUMINO-SILICATE DERIVATIVES

CROSS-REFERENCE TO RELATED APPLICATION

This application is a 35 U.S.C. §371 filing of International Application No. PCT/AU95/00699, filed Oct. 23, 1995.

FIELD OF THE INVENTION

This invention relates to the formation of new materials in the form of alumino-silicate derivatives and processes to form these new materials which are obtained by the chemical modification of clay minerals and other aluminium-bearing minerals.

The derivatives of these clays or aluminium-bearing minerals, are characterised by a predominance of tetrahedrally-coordinated $Al^{+3}$ which has resulted from the chemical modification of octahedrally-coordinated $Al^{+3}$ in the parent mineral. This transformation of the atomic-scale structure makes available a higher number of exchangeable sites than would be normally available in the original clay structure.

BACKGROUND OF THE INVENTION

Two features of the new materials which may result from the modification of these clays or of aluminium-bearing minerals are an enhanced capacity to exchange cations from solution (i.e. a cation exchange capacity) and/or an increase in the available surface area when compared with the properties of the initial starting mineral (e.g. clay or zeolite). These two features are of considerable significance to the cost-effective use of these derivative materials in a wide range of applications for cation-exchange (e.g. for removal of toxic metal ions from aqueous and non-aqueous solutions; removal of $NH_4^+$ from aqueous and non-aqueous solutions, as detergent builders and as water softeners), absorption (e.g. for the removal of gases from the environment, for absorption of cations from solutions), as agents for the controlled release of desired cations into an environment and as substrates for catalysis reactions in the modification of hydrocarbons and other chemicals.

Clay minerals are part of the larger family of minerals called phyllosilicates—or "layer" silicates. These clay minerals are typically characterised by two-dimensional arrangements of tetrahedral and octahedral sheets, each with specific elemental compositions and crystallographic relationships which define the mineral group. Thus,the tetrahedral sheet may have the composition $T_2O_5$ (where T, the tetrahedral cation, is Si, Al and/or Fe) and the octahedral sheet may commonly contain cations such as Mg, Al and Fe, but may also contain other elements such as Li, Ti, V, Cr, Mn, Co, Ni, Cu and Zn (Brindley and Brown, 1980, Crystal structures of clay minerals and their X-ray identification, Mineralogy Soc., London). Each of these clay mineral groups can be further classified into trioctahedral and dioctahedral varieties, depending on the occupancy of the octahedra in the respective sheet arrangement(s). Some specific mineral species may show cation occupancies which are intermediate between the two varieties. Nevertheless, the relative arrangement of these tetrahedral and octahedral sheets also defines the basic mineral groups in that an assemblage which links one tetrahedral sheet with an octahedral sheet is known as a 1:1 layer type mineral. An assemblage which links two tetrahedral sheets with one octahedral sheet is known as a 2:1 layer mineral. This basic classification of mineral species, based upon the crystallographic relationships of specific sub-units, is well-known by those skilled in the art of clay mineralogy and forms a basis for description of this invention.

Notwithstanding the crystallography of these sub-units within clay minerals, the alumino-silicate derivatives of this invention also include minerals which contain a tetrahedral framework of oxygen atoms surrounding either silicon or aluminium in an extended three-dimensional network. For example, various zeolites contain different combinations of linked tetrahedral rings, double rings or polyhedral units, but they are also amenable to provide an alumino-silicate derivative (hereinafter referred to as "ASD") of the invention.

The production of an amorphous derivative, termed "kaolin amorphous derivative" (KAD) from kaolin clays which are 1:1 alumino-silicates, has been described in an earlier disclosure (WO95/00441). This specification describes the production of KADs from the kaolin clay staring material by reaction of the kaolin clay with an alkali metal halide MX where M is alkali metal and X is halide.

In this specification, the reference to MX was the only example of a suitable reagent which could convert the majority of the octahedrally coordinated aluminium in the kaolin group mineral to tetrahedrally coordinated aluminium. However, no reference was made to any possible mechanism by which this phenomenon occurred.

However, surprisingly it has now been discovered that an alternative reagent such as a highly basic solution in the form of MOH where M is an alkali metal cation can provide a similar result wherein the majority of the octahedrally co-ordinated aluminium can be converted to tetrahedrally co-ordinated aluminium.

Without wishing to be bound by theory, it is hypothesised that a reagent which can achieve this particular result may comprise a compound that disassociates into cationic species and anionic species such that hydroxyl ions are present in a concentration which is in excess compared to the concentration of hydrogen ions. In addition to this feature or in the alternative, the compound causes to be formed in the resulting solution due to interaction with the alumino-silicate mineral, hydroxyl ions in excess concentrations compared with the concentration of hydrogen ions.

With the formation of excess hydroxyl ions, it would seem that such excess hydroxyl ions result in reconstruction of cation-oxygen bonding within the starting material such that a stable, amorphous material with the abovementioned desirable properties may be formed.

Again, while not wishing to be bound by theory, this chemical transformation or conversion may be represented by the following example in which kaolinite, with Al and Si in octahedral and tetrahedral sites in the kaolinite structure, respectively, is reacted with an alkali metal halide where the cation is $K^+$ or an ammonium ion in an aqueous solution such that excess halide (e.g. $X^-$) is readily exchangeable with the available hydroxyl groups ($OH^-$) in the kaolinite structure. This exchange results in the formation of a highly basic solution with an excess of $OH^-$ ions which can cause rearrangement of octahedrally co-ordinated aluminium through the action of these $OH^-$ ions on hydrogen-bonded oxygen atoms. This rearrangement of aluminium co-ordination results in primarily tetrahedrally co-ordinated aluminium in this resultant stable material. This therefore provides a suitable explanation why MX was a suitable reagent in the case of WO95/00441.

Alternatively, a highly basic solution can be generated by the use of a reagent such as a compound which disassociates into cationic and anionic species. The anions, present in excess, may also cause the rearrangement of octahedrally co-ordinated aluminium to tetrahedrally co-ordinated aluminium through their action on hydrogen-bonded oxygen atoms. Other examples of this type of chemical transformation of clays include the reaction of kaolinite or montmorillonite with a caustic reagent (e.g. MOH; where M is a cation such as $K^+$, or $Na^+$ or $Li^+$) such that rearrangement of octahedrally co-ordinated aluminium to tetrahedrally coordinated aluminium through their action on hydrogen-bonded oxygen atoms occurs.

SUMMARY OF THE INVENTION

It therefore follows that the present invention provides a process for the preparation of an alumino-silicate derivative which involves reacting a solid corresponding starting material with MOH where M is alkali metal to provide an amorphous alumino-silicate derivative (ASD).

The realisation that MOH may be utilised in addition to MX to provide an ASD is advantageous because it has now been appreciated that MOH can be utilised to provide an ASD from any corresponding starting material. This is surprising because an amorphous derivative can now be manufactured, for example, from 2:1 clays which include montmorillonites and other members of the smectite group. The production of an amorphous derivative from these 2:1 clays is surprising insofar as the structure and chemistry of these minerals is markedly different to that of the 1:1 kaolin group minerals. A unit layer of the clays in the kaolin group consists of one octahedral sheet and one tetrahedral sheet so that both sheets are exposed to the interlayer space, a region which is accessible to reacting species. However, a 2:1 clay mineral comprises one octahedral sheet and two tetrahedral sheets. The octahedral sheet, which contains octahedrally coordinated aluminium, is sandwiched between the tetrahedral sheets. The transformation of this octahedral sheet is not readily predictable using metal halides to similar reacting species since the interlayer space is surrounded by tetrahedral sheets. It is also relevant to point out that the octahedral sheet in 2:1 clay minerals would not be readily accessible to metal halide. It would be assumed by those skilled in the art that reacting species with 2:1 clay minerals would provide different products to reaction products described in w095/00441 for these reasons.

The reaction rate and preferred forms of these aluminosilicate derivatives with desirable properties will be dependent on the precise temperature of reaction for a given period of time. In general, a reaction temperature may be utilised which is less than 200° C. for a period of time of one minute to 100 hours. More preferably, the temperature is between 50–200° C. and the reaction time is less than 24 hours. In concert with this rearrangement of co-ordination of the aluminium atom(s), the presence of an additional cation (from the reagent) causes the disordered structure to be stabilised through "attachment" of the cation to an exchange site so formed by this rearrangement. During the overall chemical transformation, loss of aluminium (as well as minor amounts of silicon) from the alumino-silicate structure to the highly basic solution may occur. The preferred pH of this highly basic solution, during and near the end of the reaction, is generally>12, although reaction to form the preferred ASD may occur for solutions with pH>7.0.

Examples of alumino-silicates which may be modified by the process(es) of the invention include montmorillonite, kaolin, natural zeolite (e.g. clinoptilolite/heulandite) as well as illite, palygorskite and saponite. ASDs of the invention are characterised by predominant tetrahedral $Al^{+3}$ which has been transformed from an initial octahedrally co-ordinated state within the parent mineral (e.g. clay). In the case of e.g. montmorillonite clays, the tetrahedral $Al^{+3}$ has been transformed from a octahedrally-coordinated $Al^{+3}$ within the parent mineral (e.g. clay). Further elucidation of this ASD, henceforth designated M-ASD, where M is the exchanged cation obtained by the specific formation process, can be obtained by conventional mineral characterisation techniques which demonstrate the following properties:

(1) an "amorphous" nature (to X-ray diffraction), i.e. without any apparent long range order of the repeat units;

(2) an enhanced capacity to exchange cations (compared with the original starting mineral) from a solution;

(3) an increase in the available surface area of the material (compared with the original starting mineral) as measured by the conventional BET isotherm;

(4) an enhanced capacity (compared with the original starting mineral) to adsorb anionic species or complex polyanions from solution; and/or (5) an enhanced capacity (compared with original starting mineral) to absorb oil and/or organic molecules.

In relation to property (2), this may be exemplified by the ASDs of the invention having a cation exchange capacity of 20–900 milli-equivalents per 100 g as measured by exchange of ammonium or metal cations from an aqueous solution. Most preferably the cation exchange capacity as measured by exchange of ammonium is between about 300–450 milli-equivalents per 100 g.

In relation to property (3), this may be exemplified by the ASDs of the invention having a surface area less than 400 $m^2/g^{-1}$ as measured by the BET isotherm which is higher than the clay mineral starting material. Most preferably the BET surface area is between 25 $m^2/g$ and 200 $m^2/g$.

Properties (4) and (5) are demonstrated hereinafter in Examples 15 and 16. In these Examples, adorption of phosphate ions on the M-ASD may be increased by factors of greater 2.5 times that in solution. This property may be applied to adsorption of many other significant anionic species. Additionally, absorption of oil by an M-ASD so formed may be at least a factor of two highr than that of the starting alumino-silicate mineral.

BRIEF DESCRIPTION OF THE SEVERAL VIEWS OF THE DRAWINGS

FIG. 3 $^{27}Al$ MAS NMR spectrum for the product obtained by reaction of Ca-montmorillonite with KOH (Sample No. STx-2 in Table 4).

DETAILED DESCRIPTION OF THE INVENTION

Figure 1:
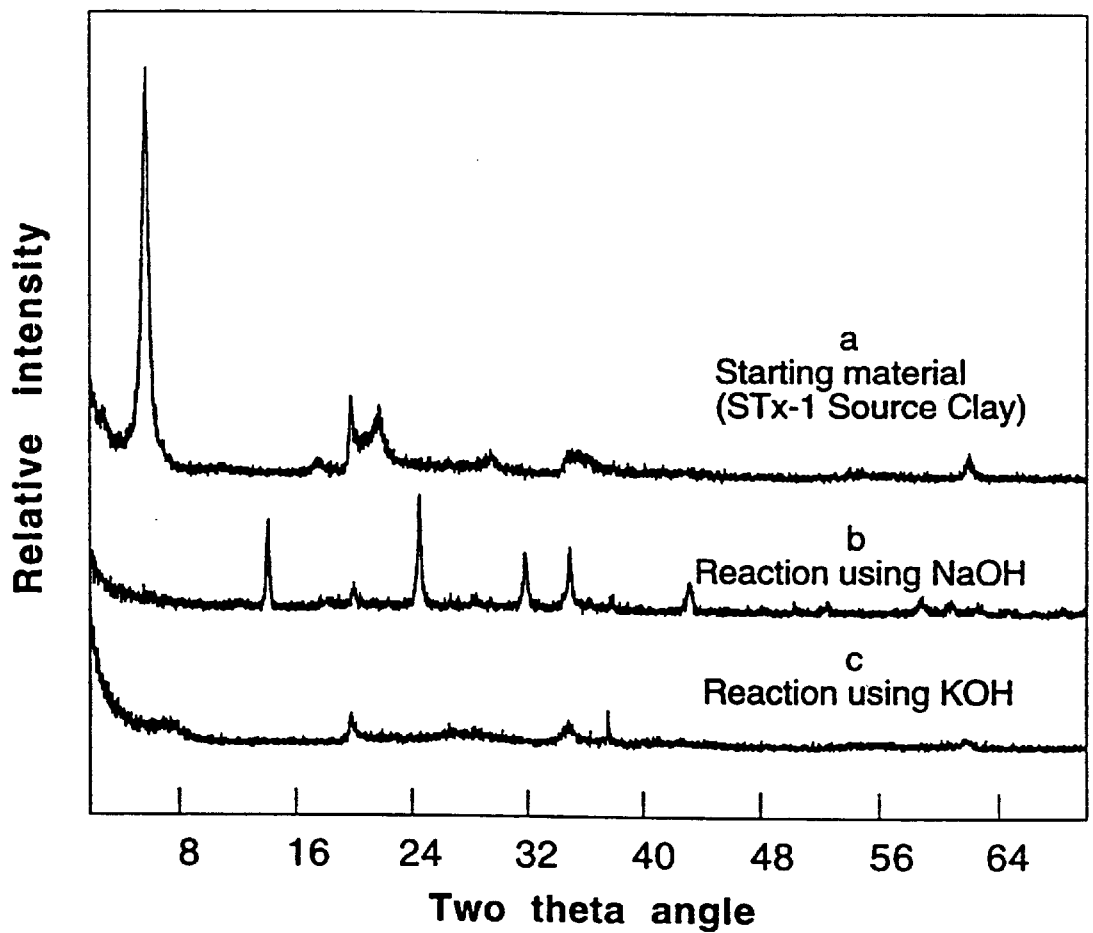
FIG. 1 Powder XRD patterns for (a) starting material Texas montmorillonite (STx-1) before reaction, (b) product formed after reaction with NaOH (Example 3), and (c) product formed after reaction with KOH (Example 1). For FIG. 1, detailed enlargements of the region between 20° and 35° 2θ are given in FIG. 2.

One form of the ASD of the invention has the chemical composition:

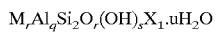

$$M_rAl_qSi_2O_r(OH)_sX_1 \cdot uH_2O$$

where M is an ammonium cation or exchangeable metal cation, X is a halide, $0.5 \leq p \leq 2.0$, $1.0 \leq q \leq 2.2$, $4.5 \leq r \leq 8.0$, $1.0 \leq s \leq 3.0$, $0.0 \leq t \leq 1.0$ and $0.0 \leq u \leq 3.0$. In one specific form, the ASD may contain the element potassium, such that M=K.

ASDs having the abovementioned chemical composition may be prepared by the reaction of the alumino-silicate starting material, such as clay mineral or zeolite, with MOH and MX in combination.

In an especially preferred form of the invention, ASDs have the chemical composition:

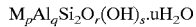

$$M_pAl_qSi_2O_r(OH)_s \cdot uH_2O$$

wherein M is an ammonium cation or exchangeable metal cation, $0.5 \leq p \leq 2.0$, $1.0 \leq q \leq 2.2$, $4.5 \leq r \leq 8.0$, $1.0 \leq s \leq 3.0$ and $0.0 \leq u \leq 3.0$ ASDs having the above described chemical composition may be prepared by a process wherein the initial starting alumino-silicate, such as a clay mineral, is reacted with MOH alone.

In the ASD referred to above, it is possible to exchange, at least partly, the alkali metal cation with any cation which is stable in aqueous solution. Such exchange cations include other alkali metal cations, alkaline earth cations, transition metal cations, lanthanide and actinide cations, heavy metal cations and ammonium. While exchange does not proceed to completion for all cations, there are many transition metal cations (e.g. $Mn^{2+}$, $Cr^{3+}$, $Co^{2+}$, $Ni^{2+}$, $Cu^{2+}$, $Zn^{2+}$, $Ag^+$), lanthanide cations (e.g. $La^{3+}$, $Nd^{3+}$) and heavy metal cations (e.g. $Pb^{2+}$, $Cd^{2+}$, $Hg^{2+}$) which do. For some cations exchange is complete after three hours at room temperature (e.g. $Pb^{2+}$, $Cu^{2+}$, $NH_4$, $Na^+$, $Ca^{+2}$, $K^+$, $Mg^{+2}$, $Li^+$), while others require longer times and higher temperatures.

Such cation exchange essentially preserves the XRD-amorphous character of the unexchanged ASD. However, the specific surface of the exchanged materials, while still higher than that of kaolin, does increase or decrease depending on the exchange cation.

For example, in the case of exchange of $Cu^{+2}$ from an aqueous solution, a new material, termed Cu-ASD, is formed and which, for example, shows a high surface area as measured by the conventional BET isotherm. To differentiate, in generic formulae, between new ASD materials formed directly via the transformation of a clay or other alumino-silicate (as in Examples 1 to 8 below) and those ASD materials formed by direct cation exchange with the directly derived ASD, the following terminology is utilised in this document:

M-ASD denotes material directly formed via the general processes described in Examples 1 to 8.

$M_e$-ASD denotes material subsequently formed via a cation exchange with M-ASD material. Descriptions of this type of material, and the methods used to obtain same, are given in Examples 8, 12 and 13.

Clearly partially formed ASDs in which two cations occupy sites or in which multiple cations are exchanged via a series of partial reactions are possible forms of this new material.

The term "ASD" as used hereinafter only includes within its scope alumino-silicate derivatives.

In the process, ratios of reactants that may be employed vary widely, as described hereinafter.

Figure 2:
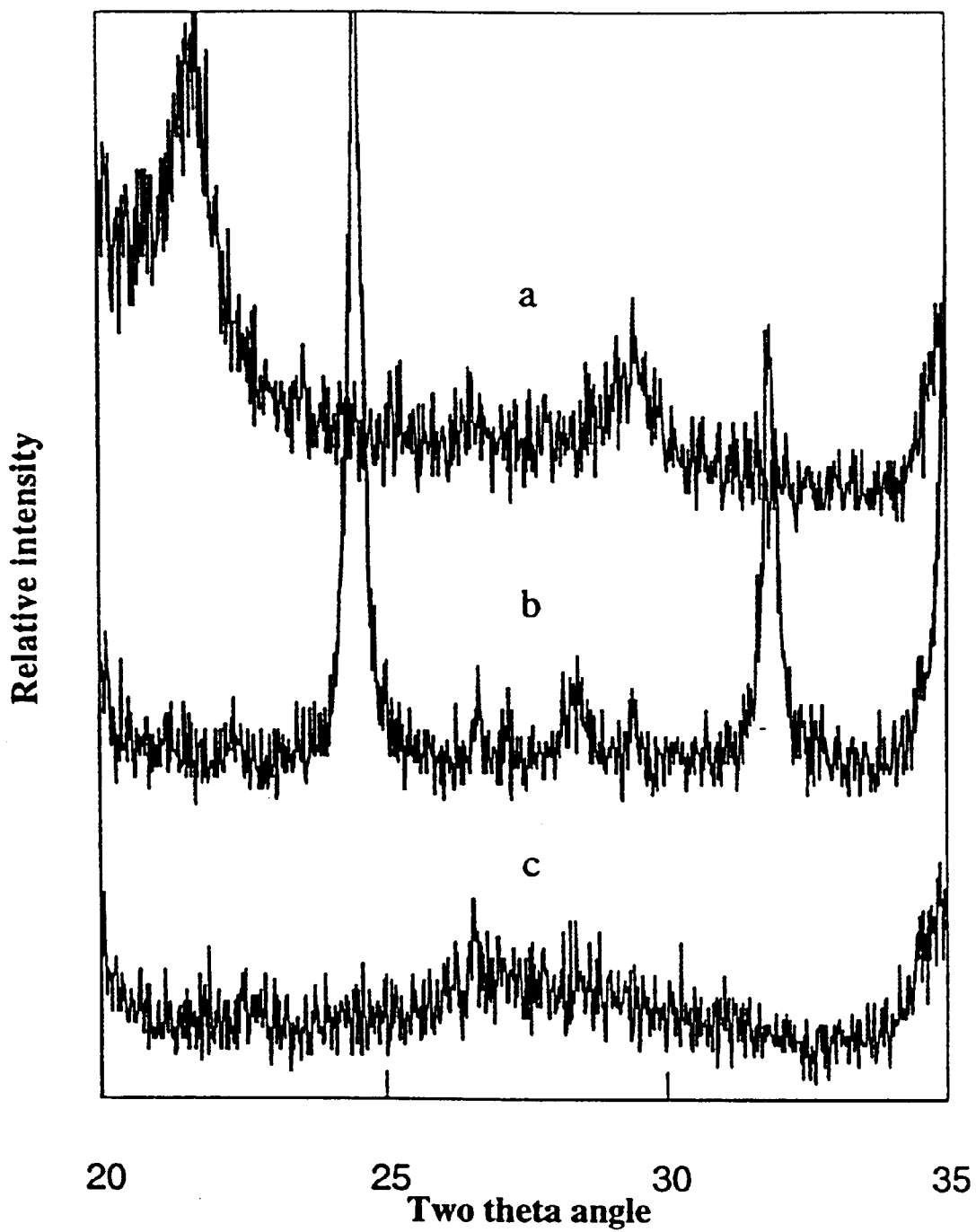
FIG. 2 Higher scale enlargements of powder XRD traces shown in FIG. 1 demonstrating the region between 20° and 35° 2θ. For FIGS. 2c and 2d, corresponding to sample numbers STx-4 and STx-5 in Table 4, the presence of a broad "hump" between 22° and 32° 2θ is readily observed.

The primary crystallographic methods to define ASD material are powder X-ray diffraction (XRD) and solid-state MAS (magic angle spinning) NMR (nuclear magnetic resonance) spectroscopy. In the case of powder XRD, the formation of M-ASD as a primary component of the reaction is denoted by a loss of sharp diffraction peaks corresponding to the original starting mineral (e.g. Ca-montmorillonite) and a corresponding increase in intensity of a broad "hump" between 22° and 32° 2θ using CuKα radiation (see, for example, FIG. 2c). With certain processing conditions, byproducts such as sodalite or kaliophillite may form (e.g. as in FIGS. 1b or 2b), although the predominant phase present is an alumino-silicate derivative. An example of typical XRD patterns, for the starting montmorillonite (STx-1) and for the respective M-ASD materials formed by two different processes (Examples 1 and 3 given below), are given in FIGS. 1a to 1c and FIGS. 2a to 2c, respectively. In the case of solid-state NMR spectroscopy, the MAS NMR signal for $^{27}$Al nuclei in M-ASD material gives a dominant peak at ~58 ppm (FWHM ~16 ppm) which is due to tetrahedral coordination of aluminium (as shown in FIG. 3). As is known by those skilled in the art, montmorillonites such as STx-1 and SWy-1 contain octahedrally-coordinated aluminium ions. This crystallographic feature can be demonstrated by a number of methods including recalculation of chemical analyses as mineral formulae and assignment of aluminium atoms to the octahedral sites in the montmorillonite structure.

The above two primary crystallographic techniques define the atomic arrangements of the critical elements in this new material termed alumino-silicate derivative and form the basis of a family of mineral derivatives which have been obtained by the chemical reaction of aluminium-bearing minerals such as clays and zeolites. The essential crystallographic features are:

the transformation of long-range order to an "amorphous" structure showing a broad X-ray diffraction "hump", or peak, between 22° and 32° 2θ using CuKα radiation; and the presence of primarily tetrahedrally co-ordinated aluminium.

Chemical analysis can be effected by a number of means, but in this disclosure, the use of an electron microprobe to quantify the amounts of elements with atomic number greater than 11 (i.e. Na or higher) is illustrated. The presence of oxygen is determined according to general principles for microanalysis of minerals known to those skilled in the art. Depending on the nature of the reactant, an exchangeable cation, such as Na or K, will be present in the alumino-silicate derivative. Typical examples of the chemical compositions of alumino-silicate derivatives formed by reaction of caustic potassium hydroxide with montmorillonite (formed by the method given in Examples 1 & 2) are given in Table 1. These chemical analyses show low total values which implies the presence of water of hydration—an expectation for material formed by these processes. In addition, typical examples of the chemical compositions of alumino-silicate derivatives formed by reaction of caustic potassium hydroxide or sodium hydroxide with kaolin (Examples 5 and 6) are given in Table 2.

A preferred formula for this type of derivative is:

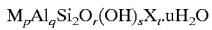

$$M_p Al_q Si_2 O_r (OH)_s X_t \cdot u H_2 O$$

where M is a cation exchanged from the reactant (e.g. Nag$^+$, Li$^+$ or K$^+$), X is an anion derived from the reactant (e.g. OH$^-$ or F$^-$ or Cl$^-$, etc.). The abundance of these elements in M-ASD with respect to each other include, but are not limited to, the following values for the atomic proportions:

$0.2 \leq p \leq 2.0$, $0.5 \leq q \leq 2.5$, $4.0 \leq r \leq 12$, $0.5 \leq s \leq 4.0$, $0.0 \leq t \leq 1.0$ and $0.0 \leq u \leq 6.0$.

Bulk physical properties for these alumino-silicate derivatives, such as BET surface area, cation exchange capacity (CEC), oil absorption, degree of basicity etc., are influenced by the nature of the processing used to form the ASD. In another aspect of the invention, this relationship shows that specific ASDs may be more suited to one application (e.g. removal of trace amounts of divalent cation) than another (e.g. absorption of gases or oils) but that in relative comparison to the clay mineral used to form the ASDs, each ASD has properties more suited to the application than the clay.

Figure 5:
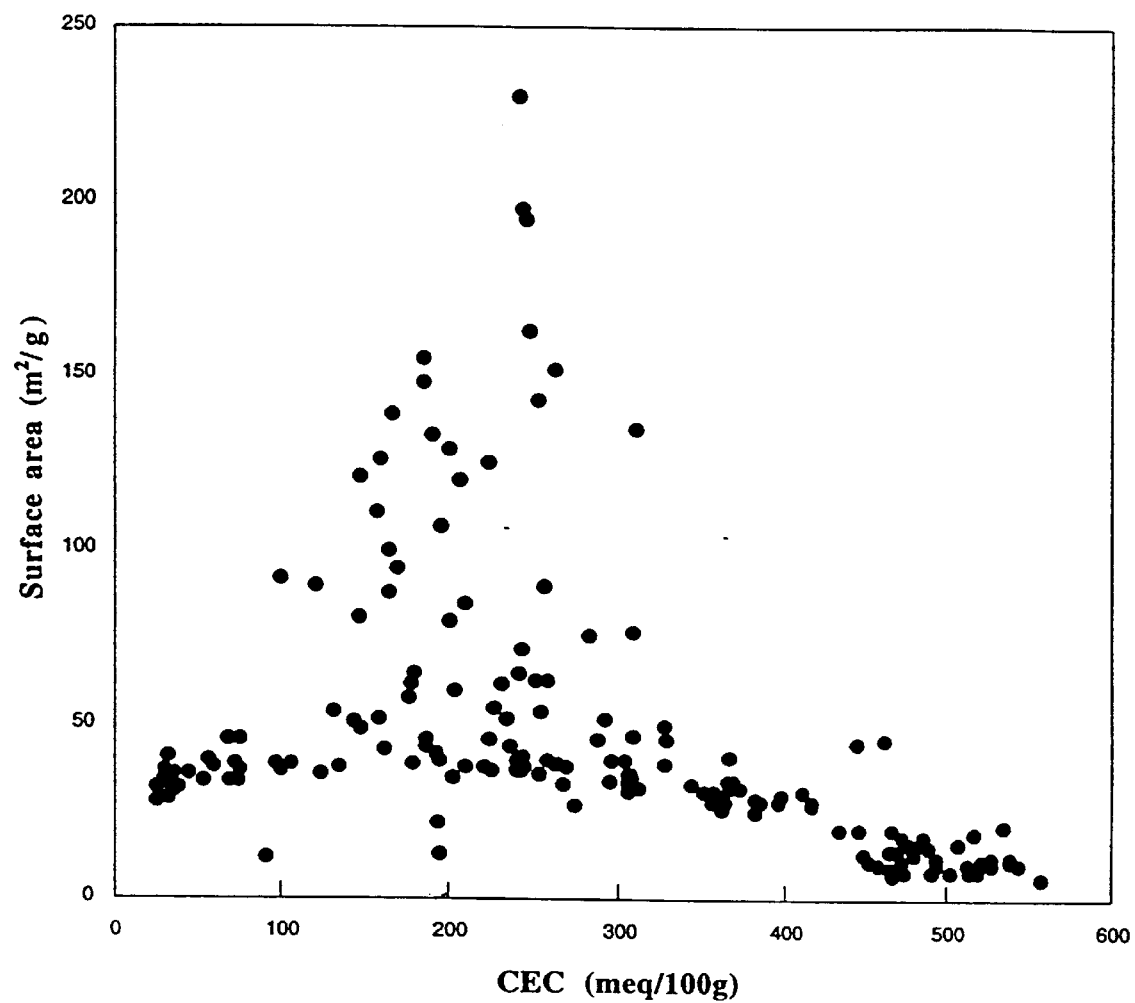
FIG. 5 Plot of CEC vs surface area for a range of samples obtained using various reactions given in Table 4. The plot shows that products with wide range properties can be obtained by these reactions.

For example, it is possible to develop a wide range of CEC values and surface area values for ASDs formed from kaolinite depending on the conditions used for processing. As described hereinafter, a high concentration of hydroxyl ions present during the reaction to form an ASD can be obtained by a variety of reactants and reaction conditions. Accordingly, FIG. 5 shows a plot of CEC values obtained by the method give for NH$_4^+$ exchange in Example 10 versus surface area values for over 150 separate reactions involving clay minerals and a reactant such as a metal hydroxide which may be in combination with metal halide. Data for conditions under which the reaction(s) do not go to completion (i.e. primarily clay mineral in the product) or under which other phases may be formed as secondary components (e.g. kaliophillite or zeolite K-F) are also included in FIG. 5. This plot designates approximately the extent of the preferred properties which provide for a predominance of M-ASD in the final product.

In WO95/00441, the preferred form of the ASD is termed kaolin amorphous derivative. However, other. kaolin amorphous derivatives can be formed by the use of reactants such as alkali hydroxides or combinations of alkali halides and alkali hydroxides. In these instances, the preferred features may extend across a broad range of values. The final product may include different by-products to that disclosed in WO95/00441. These by-products, such as kaliophilite and zeolite K-F, occur in relatively low proportions with the ASD and do not significantly affect the preferred features of the ASD so formed.

The as-formed ASD, for example, via reaction with KOH, will contain a high percentage of K$^+$ ions on the exchangeable sites of this new material. For example, Table 1 indicates ~10 wt % K$_2$O in the case of montmorillonite-derived M-ASD. In Table 2, the amount of K$_2$O ranges between ~13 wt % and ~20 wt % for kaolin-derived M-ASD using the method outlined in Example 6. As shown in Examples 9 and 10, cations such as Cu$^{+2}$, Li$^+$ or NH$_4^+$ will readily exchange with the K$^+$ or Na$^+$ of these exchangeable sites in an M-ASD to form a Cu-rich, Li-rich or NH$_4^+$-rich derivative, respectively. In this instance, the Cu-ASD shows a high value for available surface area (see Table 3) which, with suitable pre-treatment, enables use of this material, for example, as a catalyst for dehydrogenation reactions of organic compounds. Similarly, ammonium-exchanged ASD, or NH$_4$-ASD, has significant potential for use as a fertiliser or nutrient-provider in the agricultural, horticultural and feedstock industries. Alternatively, M-ASD (where M=K or Na) may also be used in the agricultural or horticultural industries to exchange ammonium ion onto a stable substrate (e.g. to form NH$_4$-ASD) for later easy removal, or subsequent use.

Other uses of the ammonium-exchange capacity of ASDs such as extraction of ammonium ion from industrial effluent or from waste products are readily. envisaged by those skilled in the art.

Figure 6:
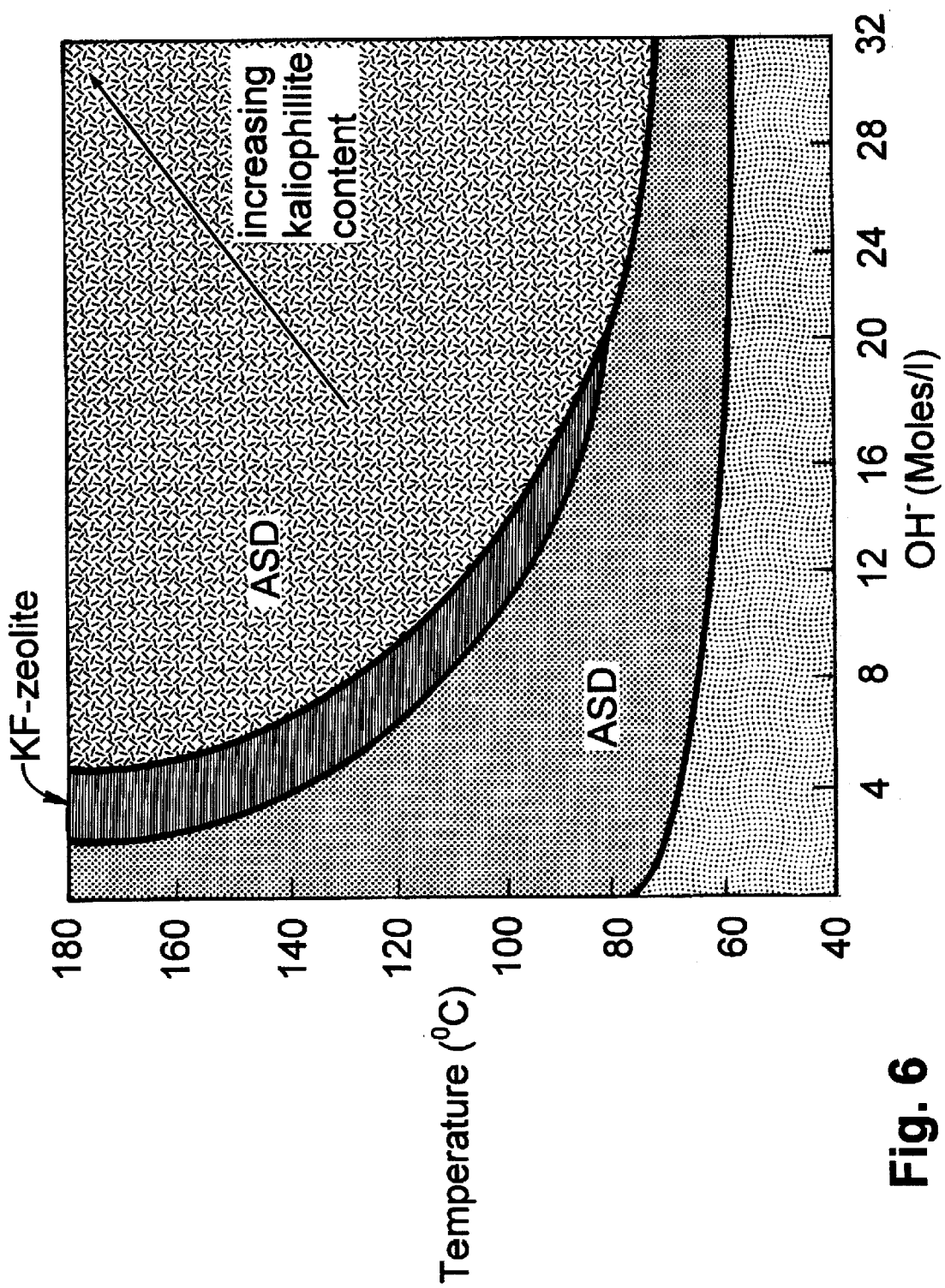
FIG. 6 A schematic diagram showing products that can be formed at various temperatures and KOH concentrations.

A general schematic showing the conditions of OH$^-$ concentration (obtained by a preferred method noted above) and temperature for the reaction is given in FIG. 6. In this schematic, the transition from one form of product (e.g. ASD) to another (e.g. zeolite K-F) may not be marked by sharp boundaries but the transition area implies a change in the relative proportions of product present. As noted in the schematic, there is a broad region of processing conditions in which predominantly ASDs form.

The invention therefore in a further aspect includes ASDs falling within the shaded area of FIG. 6.

Within this broad formation region, ASDs with specific combinations of the preferred properties may be formed (refer FIG. 5).

As noted above, M-ASD may be produced by a number of similar processes which involve the following generic modifications to the parent mineral structure:

attack by the reactant anion or cation (e.g. OH$^-$, F$^-$, Cl$^-$ or K$^+$, Na$^+$ or Li$^+$) so that a proportion of the Al—O and/or Si—O bonds within the mineral structure are weakened or broken;

loss of long-range periodicity (sometimes referred to as "crystallinity") in the mineral structure so that the derivative material resembles the original structure only as a disordered (short-range ordered) array of sub-units (e.g. SiO$_4$ tetrahedra; ALO$_4$ tetrahedra and newly-formed "exchange sites" which may or may not contain a cation);

loss of a proportion of aluminium atoms (and/or a lesser amount of silicon atoms) from the original parent mineral(s)

addition of the reactant cation (e.g. Na$^+$, K$^+$ or Li$^+$) as well as a smaller proportion of the reactant anion to the derivative material structure.

The following generic modifications to bulk physical properties also occur with progress of any of these processes for the formation of an M-ASD:

the reaction proceeds with an increase in the viscosity of the reaction mixture to a certain maximum level—determined by the relative proportions and nature of the initial reactants;

an increase in the "dispersability" of individual particles formed during the reaction process—this is assumed due, in part, to a reduction in size of the individual alumino-silicate particles—compared with the dispersability and/or size of the original starting mineral (e.g. clay or zeolite);

an increase in the bulk volume occupied by a dried powder (i.e. a "fluffy" or less-compact powder) compared with the volume occupied by the original starting mineral (e.g. clay or zeolite).

Given the above generic modifications to the original mineral species, and not wishing to be bound by theory, the following classes of reaction conditions are shown to form this alumino-silicate derivative (M-ASD):

1. Clay plus caustic reaction (e.g. kaolin+KOH or montmorillonite+NaOH);
2. Clay plus metal halide plus caustic (e.g. kaolin+KCl+KOH or montmorillonite+KCl+KOH);
3. Zeolite plus caustic (e.g. heulandite/clinoptilolite+NaOH).

A summary of these classes of reactions, using various combinations of reactant concentrations, along with some product properties, are given in Table 4. In all these classes of reactions, water is added to the reaction mix in various amounts. These classes of reactions are listed in order to demonstrate the variety of methods which can be used to arrive at the formation of alumino-silicate derivatives with the basic properties noted above.

Specific examples of the formation of alumino-silicate derivatives are given below.

EXAMPLES

Example 1

Formation of M-ASD from Ca-montmorillonite Clay 20 g of Source Clay montmorillonite from Texas (Sample No. STx-1; van Olphen and Fripiat, 1979, Data handbook for clay materials and other non-metallic minerals, Pergamon Press, Oxford, 342pp.) is thoroughly mixed with 30 g of potassium hydroxide (KOH) and 40 mls of distilled water in a beaker and then heated at 80° C. for three hours. The resulting slurry is washed with water until any excess potassium hydroxide is removed. The powder is then dried and subjected to a series of characterisation tests which include powder X-ray diffraction (FIGS. 1c and 2c), solid-state MAS NMR (FIG. 3), electron microprobe analysis (Table 1, column 1), ammonium exchange capacity, $Cu^{+2}$ exchange (Table 4), and BET surface area measurements (Table 4). Data from these characterisation techniques indicate that the material has an atomic arrangement (i.e. crystallographic features) as defined above). In general, XRD analysis indicates that with this type of reaction the amount of byproducts formed is minimal (sometimes negligible) and that>90% of the product is comprised of M-ASD material.

Example 2

Figure 4:
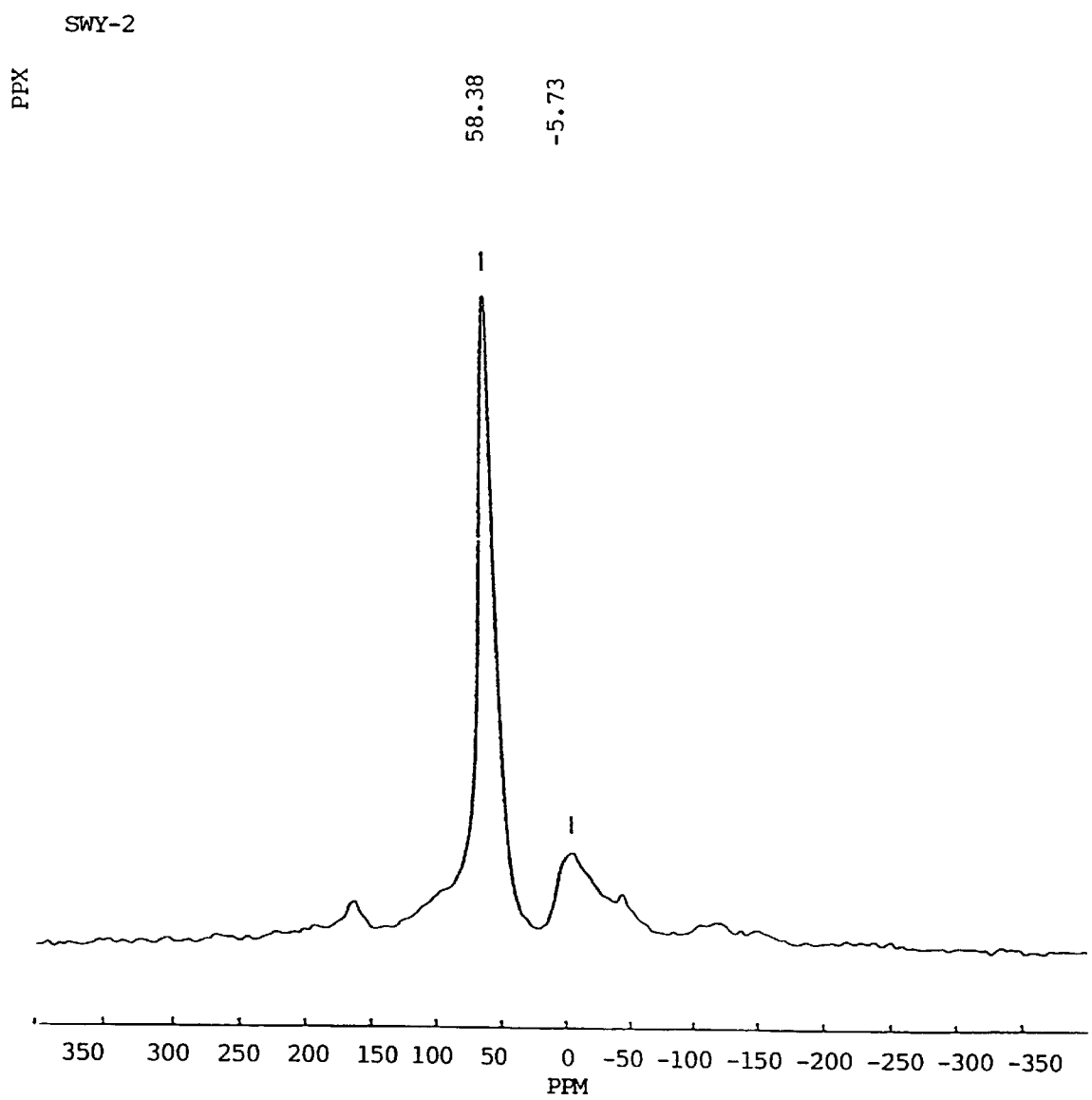
FIG. 4 $^{27}Al$ MAS NMR spectrum for the product obtained by reaction of Na-montmorillonite with KOH (Sample No. SWy-2 in Table 4).

Formation of M-ASD via Caustic Reaction with Na-montmorillonite Clay 20 g of Source Clay montmorillonite from Wyoming (Sample No. SWy-1; van Olphen and Fripiat, 1979, Data handbook for clay materials and other non-metallic minerals, Pergamon Press, Oxford, 342pp.) is thoroughly mixed with 30 g of potassium hydroxide (KOH) and 40 mls of distilled water in a beaker and heated at 80° C. for three hours. The resulting slurry is washed with water until any excess potassium hydroxide is removed. The powder is then dried and subjected to a series of characterisation tests which include powder X-ray diffraction, solid-state MAS NMR (FIG. 4), electron microprobe analysis (Table 1, column 2), ammonium cation exchange capacity (Table 4), $Cu^{+2}$ exchange (Table 4), and BET surface area measurements (Table 4). Data from these characterisation techniques indicate that the material has an atomic arrangement (i.e. crystallographi features) as defined above. In general, XRD analysis indicates that, with this type of reaction, the amount of byproducts formed is minimal (sometimes negligible) and that≧90% of the product is comprised of M-ASD material.

In both samples of montmorillonite clay noted above, impurity minerals such as quartz, carbonates and poorly-defined silica minerals are present. In all cases, the presence of minor amounts of impurity minerals does not significantly affect the nature of these reactions and/or the formation of alumino-silicate derivatives.

Example 3

Formation of M-ASD from Ca-montmorillonite using Caustic NaOH 20 g of Source Clay montmorillonite from Texas (Sample No. STx-1; van Olphen and Fripiat, 1979, Data handbook for clay materials and other non-metallic minerals, Pergamon Press, Oxford, 342pp.) is thoroughly mixed with 60 g of sodium hydroxide (NaOH) and 60 mls of distilled water in a beaker and heated at 80° C. for three hours. The resulting slurry is washed with water until any excess sodium hydroxide is removed. The powder is then dried and subjected to a series of characterisation tests which include powder X-ray diffraction (FIGS. 1b and 2b), ammonium exchange capacity (Table 4), and BET surface area measurements (Table 4). Data from these characterisation techniques indicate that the material has an atomic arrangement (i.e. crystallographic features) as defined above. In general, XRD analysis shows that with this type of reaction the amount of byproducts formed is somewhat higher than in Examples 1 and 2 and that a significant proportion of the byproduct is the mineral sodalite. As shown below in Example 10, the removal of impurity phases formed by this reaction, or similar reactions, can be effected by washing the products with an acid.

Example 4

Formation of M-ASD via Reaction of a Natural Zeolite with Caustic NaOH

Figure 7:
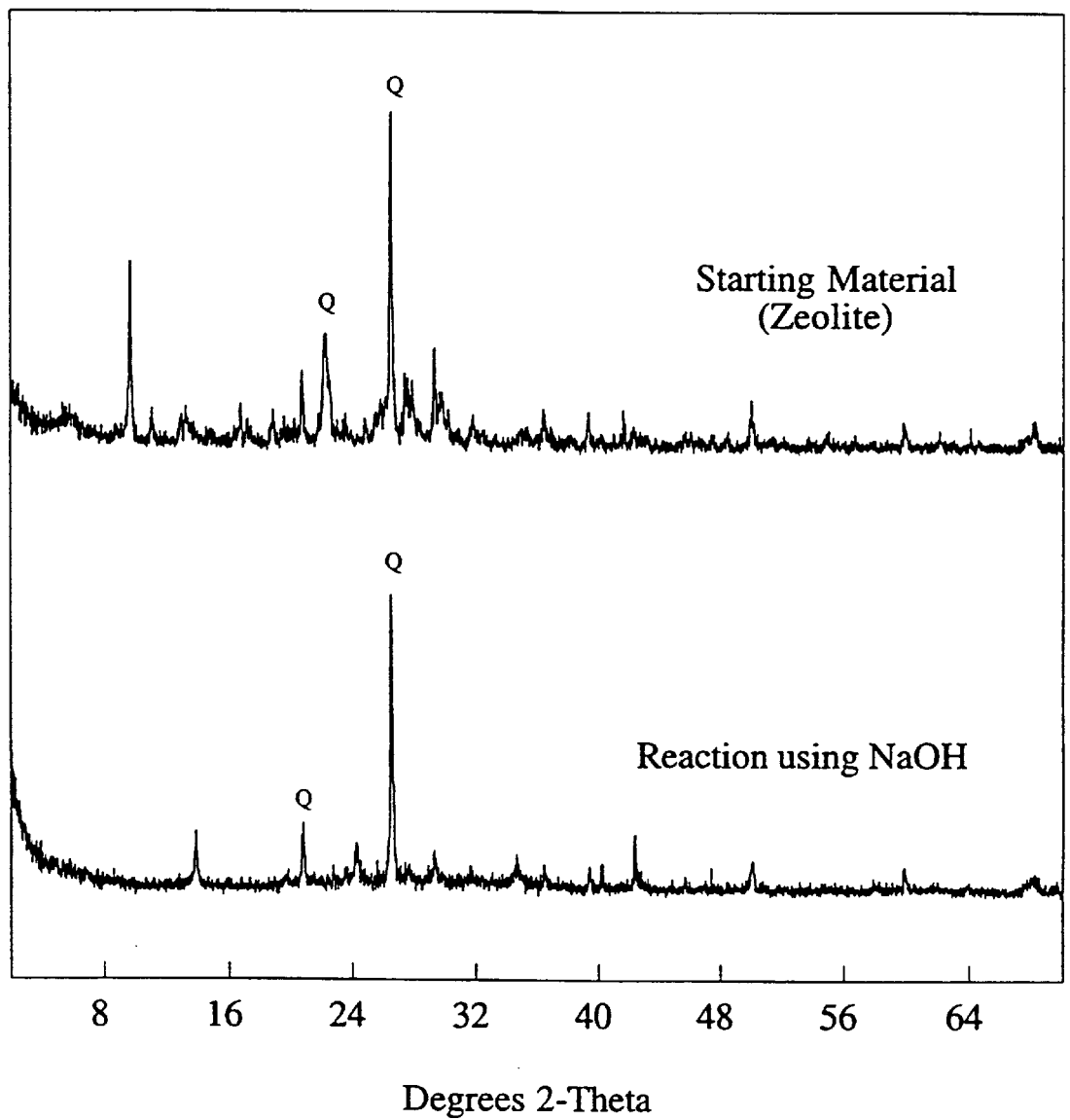
FIG. 7 Powder XRD trace for (a) zeolite starting material before reaction and (b) product obtained after reaction with NaOH (Sample No. Zeo-1 in Table 4; Example 5, in text). X-ray peaks corresponding to impurity phases such as quartz, which is present in the starting material, are denoted in FIG. 5B. Note that the zeolite peaks diminish considerably in the trace for the reaction product.

A sample of natural zeolite which contains two specific mineral species, clinoptilolite and heulandite, has been obtained from an operating mine in Eastern Australia. Both clinoptilolite and heulandite are Ca—Na-based alumino-silicates (e.g. with chemical composition $(Ca,Na_2)[Al_2Si_7O_{18}].6H_2O$). In this case, 5 g of natural zeolite (powdered to<1 mm size fraction), 5 g of NaOH and 20 mls of distilled water are thoroughly mixed in a beaker and then heated at 80° C. for three hours. The resulting slurry is washed with water until any excess sodium hydroxide is removed. The powder is then dried and subjected to a series of characterisation tests which include powder X-ray diffraction (FIG. 7), ammonium exchange capacity (Table 4), $Cu^{+2}$ exchange (Table 4) and BET surface area measurements. Data from these characterisation techniques indicate that the material has an atomic arrangement (i.e. crystallographic features) as defined above.

Example 5

Figure 8:
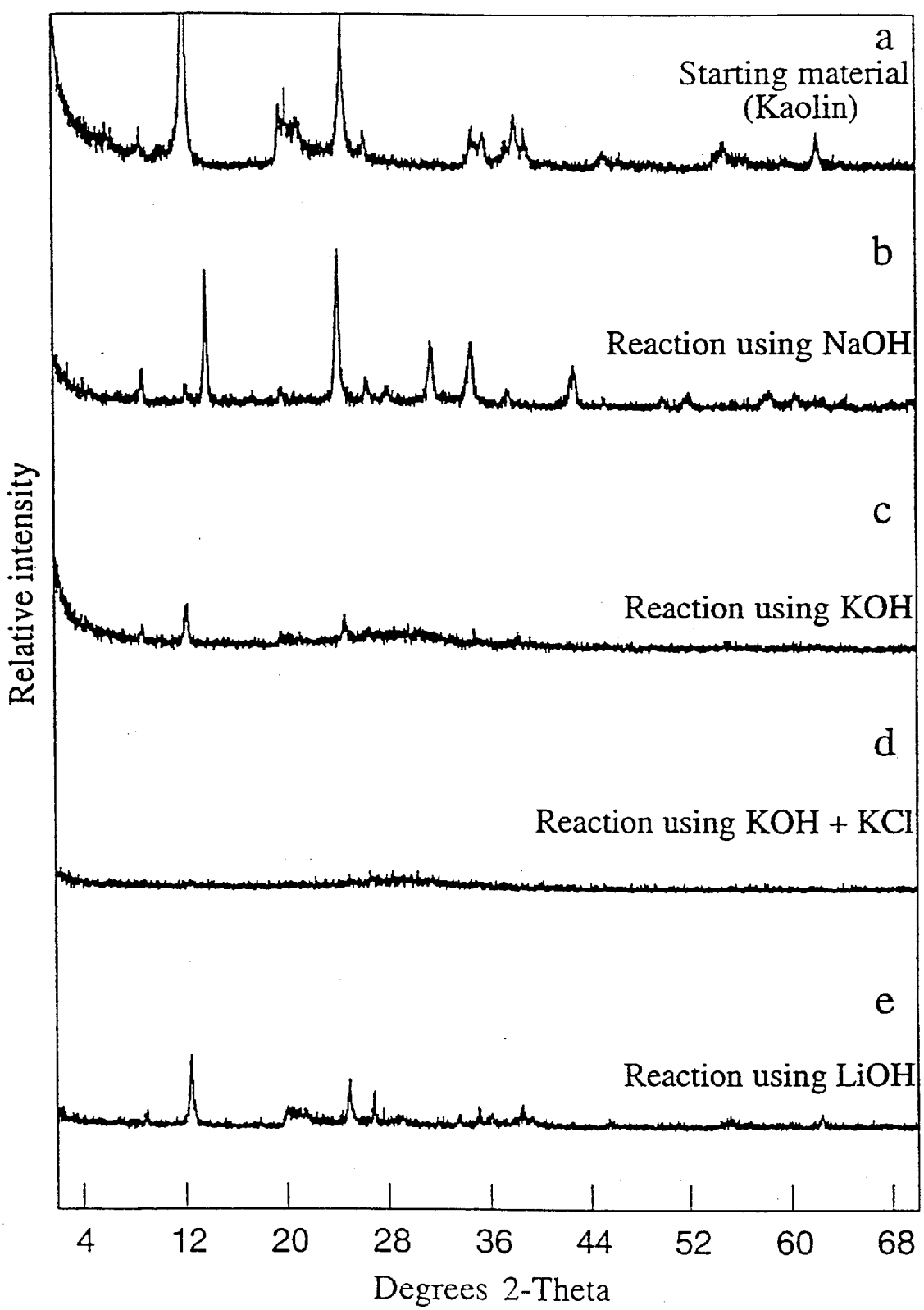
FIG. 8 Powder XRD trace for (a) starting kaolin before reaction, (b) product obtained after reaction with NaOH (byproducts from the reaction are designated with an *) as detailed in Example 5, (c) product obtained after reaction with KOH as detailed in Example 6, (d) product obtained after reaction with KOH+HCl as detailed in Example 7 and (e) product obtained after reaction with LiOH as detailed in Example 8.

Formation of M-ASD via Reaction of Kaolin with NaOH 10 g of kaolin supplied by Commercial Minerals ("Microwhite kaolin") is thoroughly mixed with 10 g of sodium hydroxide (NaOH) and 20 mls of distilled water in a beaker and heated at 80° C. for three hours. The resulting slurry is washed with water until any excess sodium hydroxide is removed. The powder is then dried and subjected to a series of characterisation tests which include powder X-ray diffraction (FIG. 8$b$), ammonium exchange capacity, $Cu^{+2}$ exchange (Table 4), and BET surface area measurements (Table 4). Data from these characterisation techniques indicate that the material has an atomic arrangement (i.e. crystallographic features) as defined above. In general, XRD analysis shows that with this type of reaction the amount of byproducts formed is somewhat higher than in Examples 1 and 2 and that a significant proportion of the byproduct is the mineral sodalite. As shown below in Example 12 (and FIG. 14), the removal of impurity phases formed by this reaction, or similar reactions, can be effected by washing the products with a dilute acid.

Example 6

Figure 9:
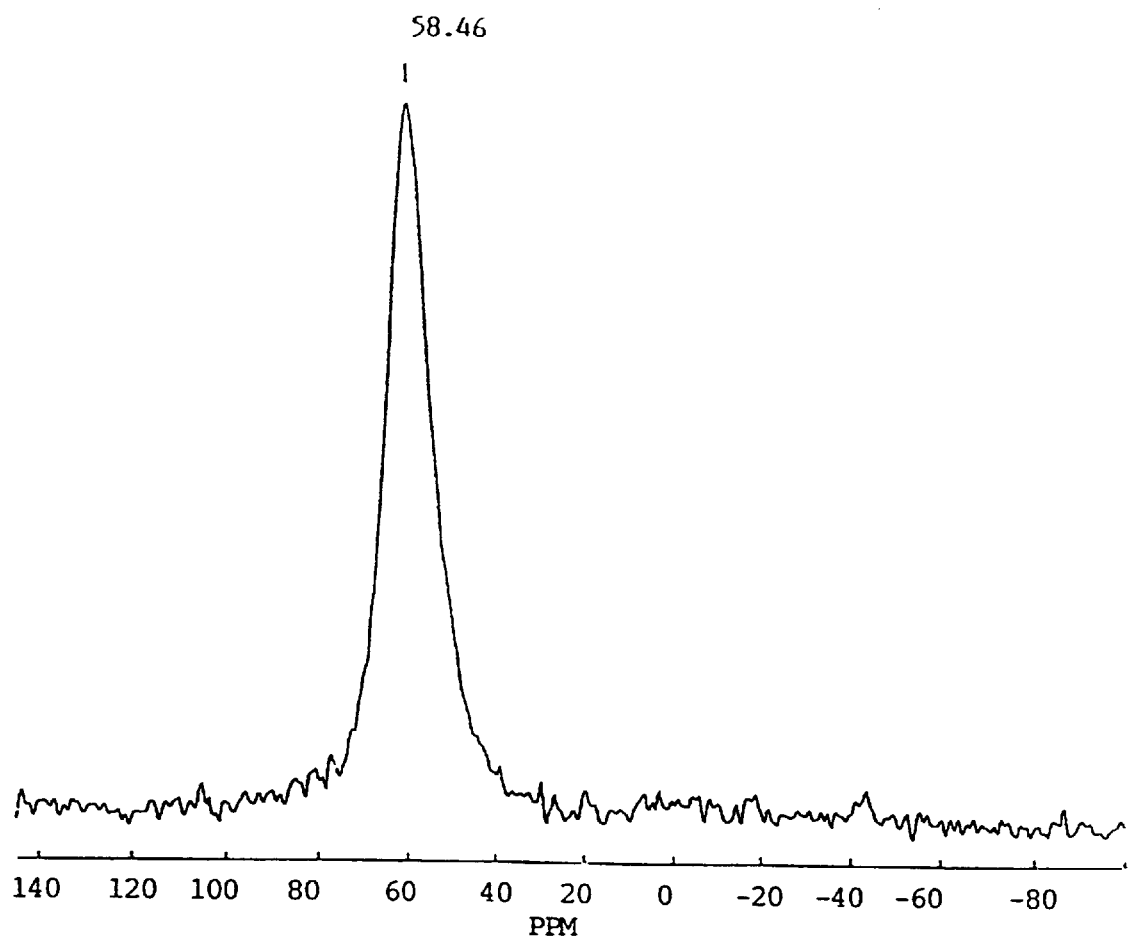
FIG. 9 $^{27}$Al MAS NMR spectrum for the product obtained by reaction of kaolinite with KOH.

Formation of M-ASD via Reaction of Kaolin with KOH 5 g of kaolin supplied by Commercial Minerals ("Microwhite kaolin") is thoroughly mixed with 26.88 g of potassium hydroxide (KOH) and 20 mls of distilled water in a beaker and heated at 80° C. for four hours. The resulting slurry is washed with water until any excess potassium hydroxide is removed. The powder is then dried and subjected to a series of characterisation tests which include powder X-ray diffraction (FIG. 8$c$), ammonium exchange capacity (Table 4) and BET surface area measurements (Table 4). FIG. 9 shows an $^{27}Al$ solid state NMR signal for the M-ASD so formed. Data from these characterisation techniques indicate that the material has an atomic arrangement (i.e. crystallographic features) as defined above. In general, XRD analysis indicates that, with this type of reaction, the amount of byproducts formed is minimal (sometimes negligible) and that>90% of the product is comprised of M-ASD material.

Figure 10A:
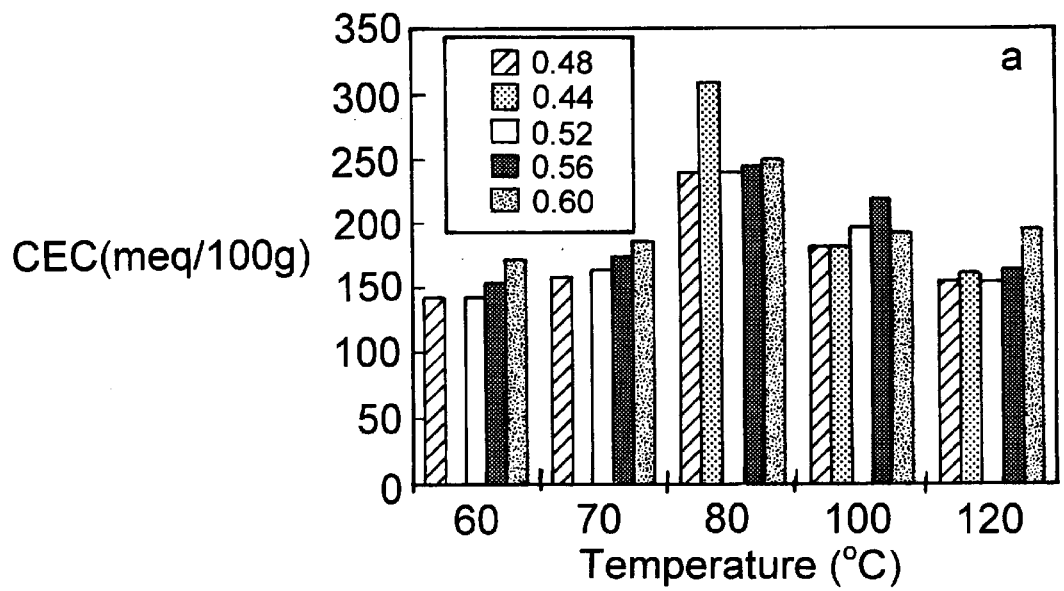
FIG. 10 Plots of CEC (a) and surface area (b) for products obtained at various temperatures and KOH concentrations. The KOH levels are expressed as moles/20 ml of water.
Figure 10B:
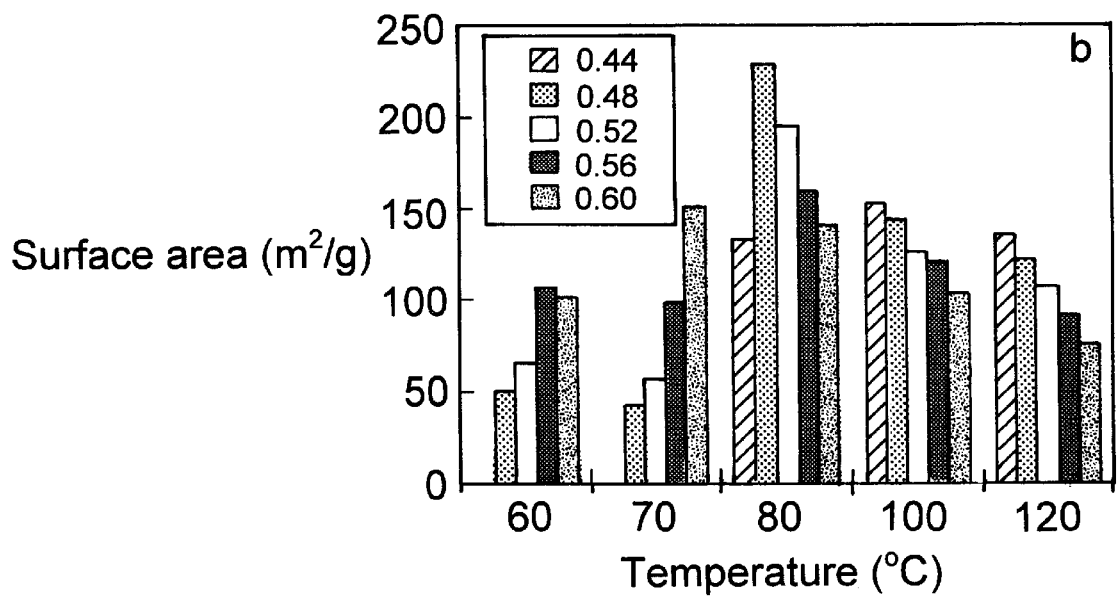

As noted above, the formation of M-ASD via reaction with KOH may occur over a range of temperatures and/or concentrations of hydroxide. FIG. 10 plots the variation in desired properties of these M-ASDs for reactions with kaolin at different concentrations of KOH at different temperatures of reaction. In FIG. 10B, BET surface area values show a gradual decrease with temperature of reaction (for temperatures above and below the preferred temperature of 80° C.) and with increased concentration of KOH. Correspondingly, FIG. 10A shows that the relative CEC values (for exchange of ammonium) for various M-ASDs also gradually decreases with temperature of reaction for temperatures above and below the preferred temperature of 80° C. The change in CEC value for increased KOH concentration is less marked under these reaction conditions. In addition, the relative amounts of water used in the reaction process can be varied depending on the concentration(s) of hydroxide. Table 5 shows the attainment of similar CEC and SA values for an M-ASD using two different ratios of kaolin to KOH for two different "consistencies" of solution (i.e. determined by the amount of water added) under identical temperature and reaction time conditions.

Example 7

Figure 11:
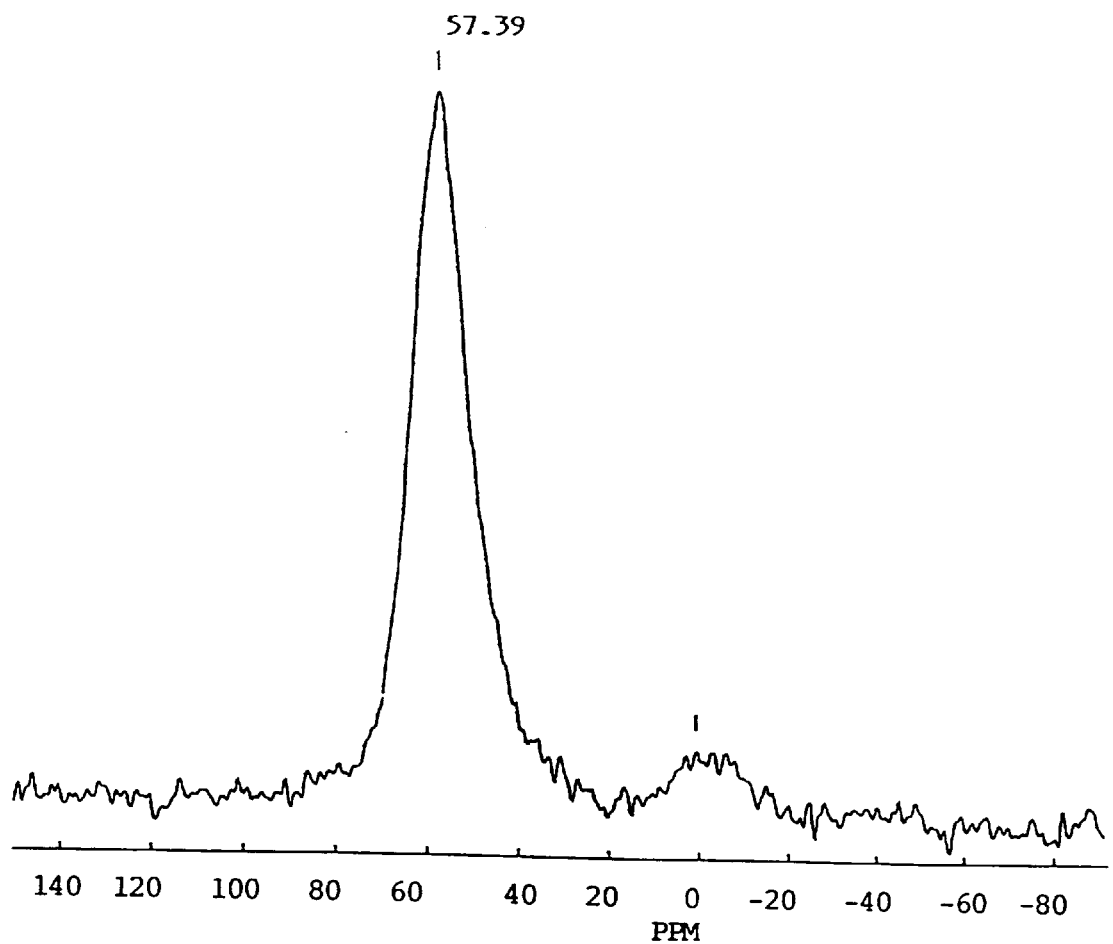
FIG. 11 $^{27}$Al MAS NMR spectrum for the product obtained by reaction of kaolinite with KOH and HCl.
Figure 12A:
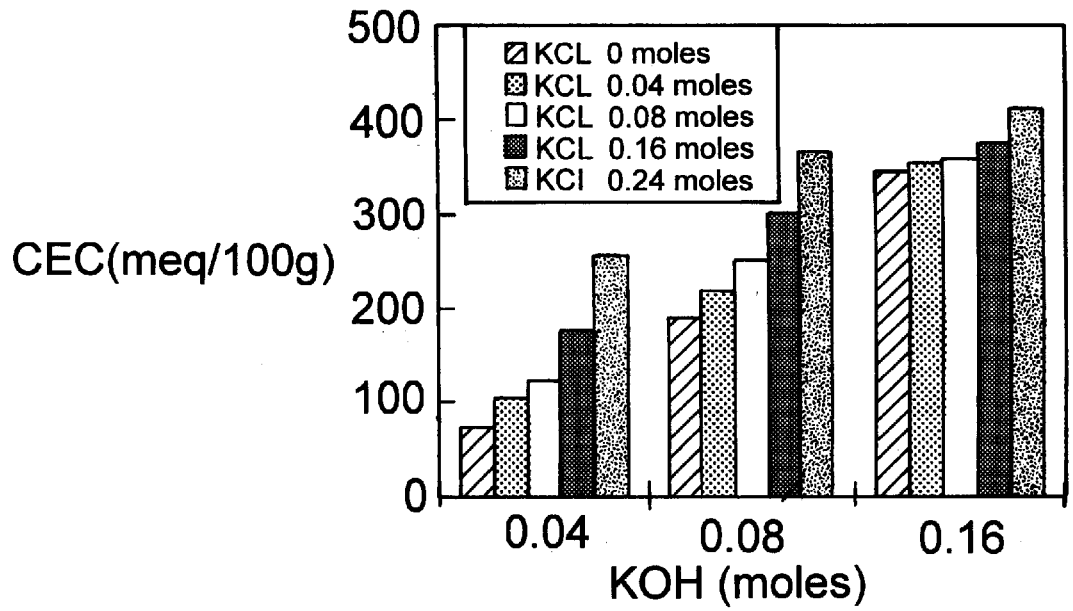
FIG. 12 Plots of CEC (a) and surface area (b) for products using KOH and HCl at 80° C. The KOH and HCl concentrations are expressed as moles/20 ml for 5 g of clay used in the reactions.
Figure 12B:
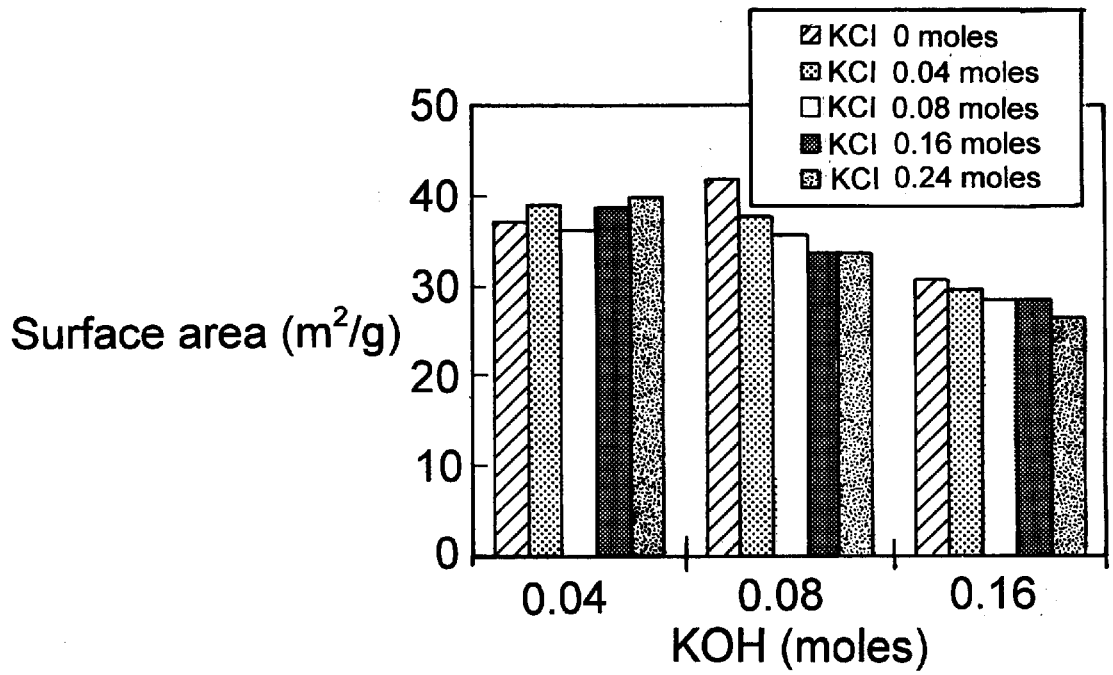

Formation of M-ASD via Reaction of Kaolin with KOH and KCl 5 g of kaolin supplied by Commercial Minerals ("Microwhite kaolin") is thoroughly mixed with 4.48 g of KOH, 11.92 g of KCl and 20 mls of water in a beaker and heated to 80° C. in a beaker for 16 hours. The resulting slurry is washed with water until any excess potassium hydroxide and potassium chloride is removed. The powder is then dried and subjected to a series of characterisation tests which include powder XRD (FIG. 8D), solid-state $^{27}Al$ NMR (FIG. 11), ammonium exchange capacity and BET surface area measurements (Table 4). Data from the measurements indicate that the material has an atomic arrangement (i.e. crystallographic features) as defined above. In general, XRD analysis indicates that, with this type of reaction, the amount of by-products formed is minimal and that>90% of the product is comprised of M-ASD material. In this case, the BET surface area and CEC ($NH_4^+$) values for the M-ASD so formed are 28 $m^2/g$ and 356 meq/100 g, respectively An indication of the means by which specific desired properties can be achieved with these M-ASDs is given in FIG. 12 which plots both CEC and BET surface area values for a range of M-ASDs produced by this general reaction class for a limited set of KOH/KCl concentrations. In FIG. 12A, the CEC values increase with increase in KCl concentration under the same reaction conditions (time and temperature) and in FIG. 12B, there is a minor but measurable decrease in surface area with increased KCl concentration under the same reaction conditions.

Example 8

Formation of M-ASD via Reaction of Kaolin with LiOH 5 g of kaolin supplied by Commercial Minerals ("Microwhite kaolin") is thoroughly mixed with 20 g of LiOH and 20 mls of water in a beaker and heated at 80° C. for 16 hours. The resulting slurry is washed with water until excess LiOH is removed. The powder is then dried and subjected to a series of characterisation tests which include powder XRD (FIG. 8E), ammonium exchange capacity and BET surface area measurements (Table 4). Data from the measurements indicate that the material has an atomic arrangement (i.e. crystallographic features) as defined above. In this case, the BET surface area and CEC ($NH_4^+$) values for the M-ASD so formed are 31 $m^2/g$ and 79 meq/100 g, respectively.

Example 9

Uptake of $Cu^{+2}$ from an Aqueous Solution using M-ASD and Formation of $M_e$-ASD 75 mg of M-ASD, obtained by the general process defined in Example 2, is placed in a 0.1 M $NaNO_3$ solution containing 200 ppm $Cu^{+2}$ at pH ~5.6 and shaken overnight for a period of approximately 16 hours and held at room temperature (~25° C.) during this time. The sample was centrifuged and an aliquot of the supernatant solution was analysed for remaining $Cu^{+2}$. In this experiment, the concentration of $Cu^{+2}$ remaining in the aqueous solution is 52.8 $\mu g/ml$ (or 52.8 ppm). This result indicates that, in this specific case, the M-ASD produced by the process described in Example 2 will remove 74% of the $Cu^{+2}$ cations in a 200 ppm $Cu^{+2}$ solution in a period of approximately 16 hours at room temperature. This example presents one method used for assessing the relative capacity of these new materials for exchange of $Cu^{+2}$ cations.

Table 4 lists, for various classes of processing conditions used in these reactions, the proportion of $Cu^{+2}$ removed from a standard solution by a defined amount of M-ASD under the above standard conditions. Data on preferred properties for a range of starting clays or zeolites are given in Table 6. This Table provides data on CEC ($NH_4^+$), surface area, $Cu^{+2}$ exchange and other properties for comparison with similar data on ASDs in other Tables. Values for remaining $Cu^{+2}$ which are less than 100 μg/ml are reasonably considered commercially-viable materials for the exchange of divalent cations. In general, this tabulation of $Cu+^2$ exchange capacity is considered a guide to the relative exchange capacity for each M-ASD for a wide range of cations including $Al^{+3}$, $Mg^{+2}$, $Ca^{+2}$, $Fe^{+2}$, $Cr^{+3}$, $Mn^{+2}$, $Ni^{+2}$, $Co^{+2}$, $Ag^+$, $Zn^{+2}$, $Sr^{+2}$, $Nd^{+3}$, $Hg^{+2}$, $Cd^{+2}$, $Pb^{+2}$ and $UO_2^{+2}$.

The material formed upon exchange with $Cu+^2$, designated Cu-ASD, is itself a new material which has similar structural properties to the generically-designated M-ASD except for the replacement of, for example, K (and/or Li and/or Na) on the exchange site with Cu. This material has high surface area values, in some cases, considerably higher than that recorded for the original M-ASD material before $Cu^{+2}$ exchange. A summary of BET surface area values for selected copper-exchanged ASD materials is given in Table 3.

Example 10

Exchange of $NH_4^+$ from an Aqueous Solution using M-ASD and Formation of $M_e$-ASD. Determination of CEC for Various Cations (e.g. $Na^+$ and $LI^+$).

0.5 g of M-ASD formed by modification of clay minerals using the methods noted above is placed in a centrifuge bottle and 30 ml of 1 M $NH_4Cl$ is added and allowed to equilibrate overnight. The sample is centrifuged and the supernatant is removed. A fresh amount of 30 ml 1 M $NH_4Cl$ is added and the sample is shaken for 2 hours. This procedure of centrifuging, removal of supernatant and addition of 30 ml 1 M $NH_4Cl$ is repeated three times. Any entrained $NH_4Cl$ is removed by washing with ethanol. At this point, the remaining material is an exchanged ASD, such as $NH_4ASD$. To determine a CEC value for the specific M-ASD material, a further 30 ml of 1 M $NH_4Cl$ is added to the washed sample and allowed to equilibrate overnight. The supernatant is then collected after centrifugation and a further 30 ml of 1 M KCl solution is added and shaken for two hours. This procedure of centrifuging, removal of supernatant and addition of KCl is repeated three times. Finally, distilled water is added to make up 100 ml of solution and the amount of $NH_4^+$ present is measured by ion-selective electrode. This procedure follows that given by Miller et al., 1975, Soil Sci. Amer. Proc. 39 372–373, for the determination of cation exchange capacity and similar procedures are used for CEC determination for other cations such as $Na^+$ and $Li^+$. All CEC values tabulated for a range of M-ASDs have been determined by this basic procedure. Table 7 gives the CEC values for exchange of $NH_4^+$, $Na^+$ and $Li^+$ for a range of M-ASDs made by the methods outlined above.

Example 11

Improvement in the $Cu^{+2}$ Exchange Capacity for M-ASD by Pre-treatment

Figure 13:
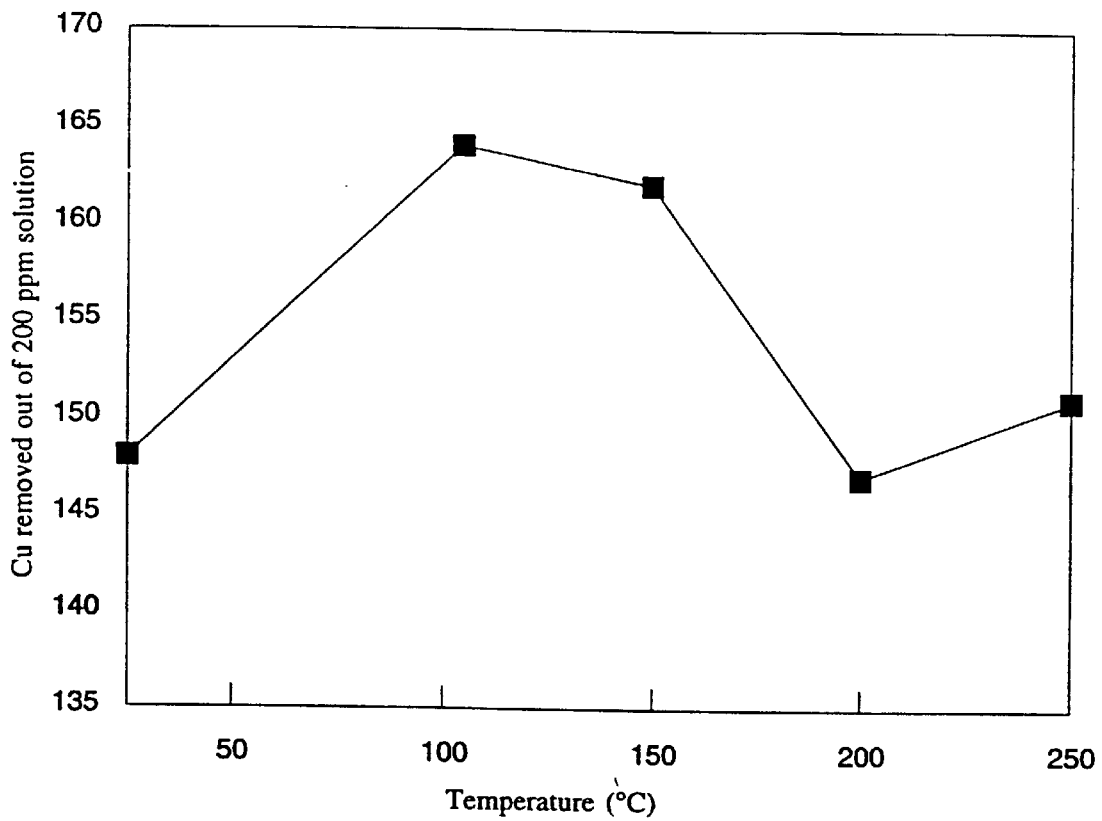
FIG. 13 Plot of the amount of Cu exchanged from a solution containing 200 ppm $Cu^{+2}$ for a K-ASD sample after heat treatment for two hours (Example 11). Note the increase in $Cu^{+2}$ exchange for K-ASD material heated between 100° C. and 200° C.

Samples of 2 g of M-ASD formed by the generic process (clay+reactant) using kaolin are placed in alumina crucibles, heated to different temperatures (from 105° C. up to 600° C. in 50° C. intervals) for periods of two hours. Each sample is cooled to room temperature and then subjected to a $Cu^{+2}$ exchange experiment as described in Example 9 above. The relative exchange of $Cu^{+2}$ compared with untreated M-ASD (25° C.) is given in FIG. 13. In this figure, the amount of $Cu^{+2}$ exchanged from solution is presented for a number of different temperature treatments between 50° C. and 250° C. As is evident from FIG. 13, an increase in the $Cu^{+2}$ exchange capacity has occurred for those samples of M-ASD heated to temperatures between 100° C. and 200° C. In the specific cases shown in FIG. 13, increases in the exchange capacity by about 10% relative occur through this pre-treatment.

Example 12

Removal of Impurity Byproducts by Final Treatment with Dilute Acid

Figure 14:
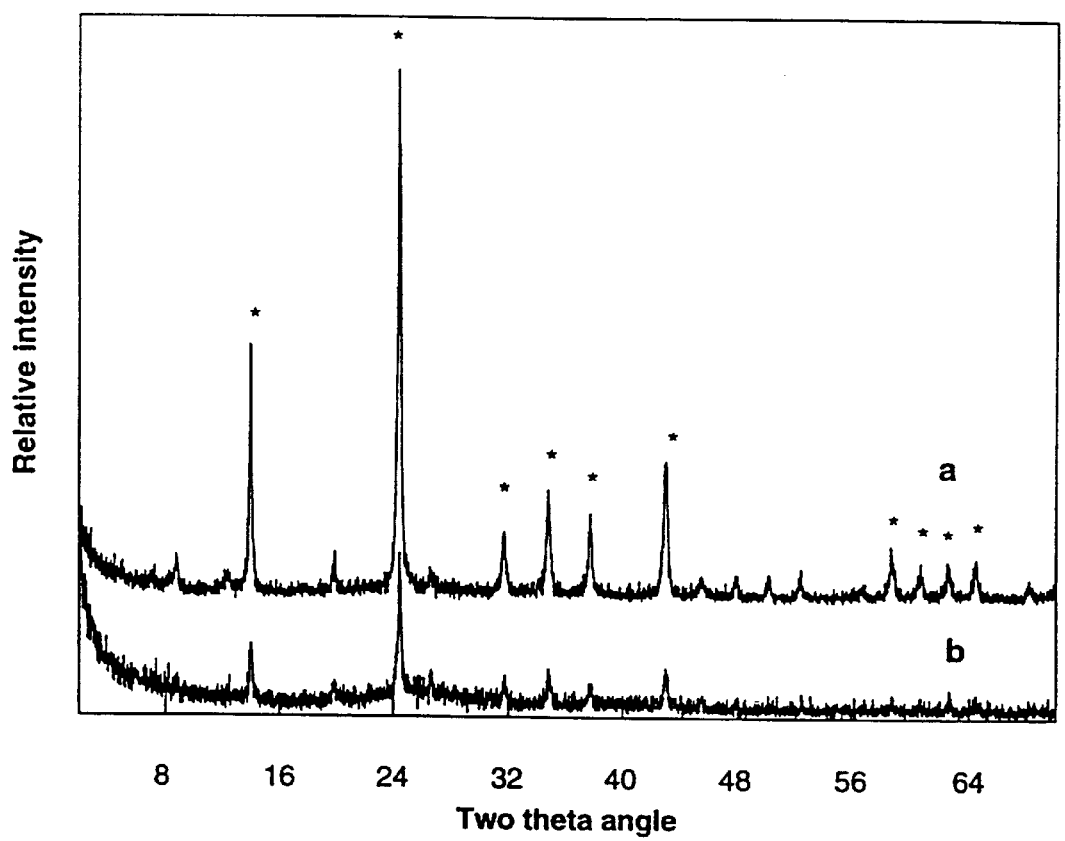
FIG. 14 Powder XRD trace for sample KCM-8 (a) before and (b) after treatment with dilute acid (Example 12). Note that XRD peaks for impurity phases evident in FIG. 14A (denoted by *) are not present in FIG. 14B.

As noted previously, in cases where clay or zeolite is reacted with NaOH or, alternatively, when clay is reacted with a high concentration of KOH, significant levels (>5% relative) of impurity phases occur in the product. In this example, samples prepared by reacting kaolin with a caustic agent (Examples 3 and 5 above) have been subsequently treated to remove the impurity phases such as sodalite. 5 g of reaction product are mixed with 50 ml of 0.25 M HCl in centrifuge tubes, shaken for a period of approximately two hours and then washed with distilled water. XRD of the dried powders after this treatment show that the impurity phases have been removed and, if present, constitute<5% relative of the total product phases. FIG. 14 shows XRD traces for an M-ASD prepared by the method given in Example 5 above before and after treatment with acid, respectively. XRD peaks corresponding to impurity phases present in the M-ASD sample are designated by an asterisk (*) in FIG. 14.

Example 13

Conversion of KAD to Na-ASD via Exchange Reaction

Two samples of KAD and derived from two different kaolins (Commercial Minerals "Micro-white" KCM4, Table 4; and Comalco Minerals kaolin from Weipa: KWSD1) and produced by the method outlined in WO98/00441 were selected for this experiment. In the former case, sample number KCM4, 2 g of material were equilibrated with 50 ml of 1 M NaOH solution. In the latter case, sample number KWSD1, 10 g of material were equilibrated with 50 ml of 1 M NaOH solution. In each case, the supernatant was discarded and additional amounts of fresh 1 M NaOH were added three times to ensure complete equilibrium exchange at the appropriate concentration. The samples were finally washed with deionised water, dried to a powder and analysed for bulk chemical composition (electron microprobe analysis), $Cu^{2+}$ cation exchange (via method outlined in Example 9, above) and crystal structure (via XRD).

Figure 15:
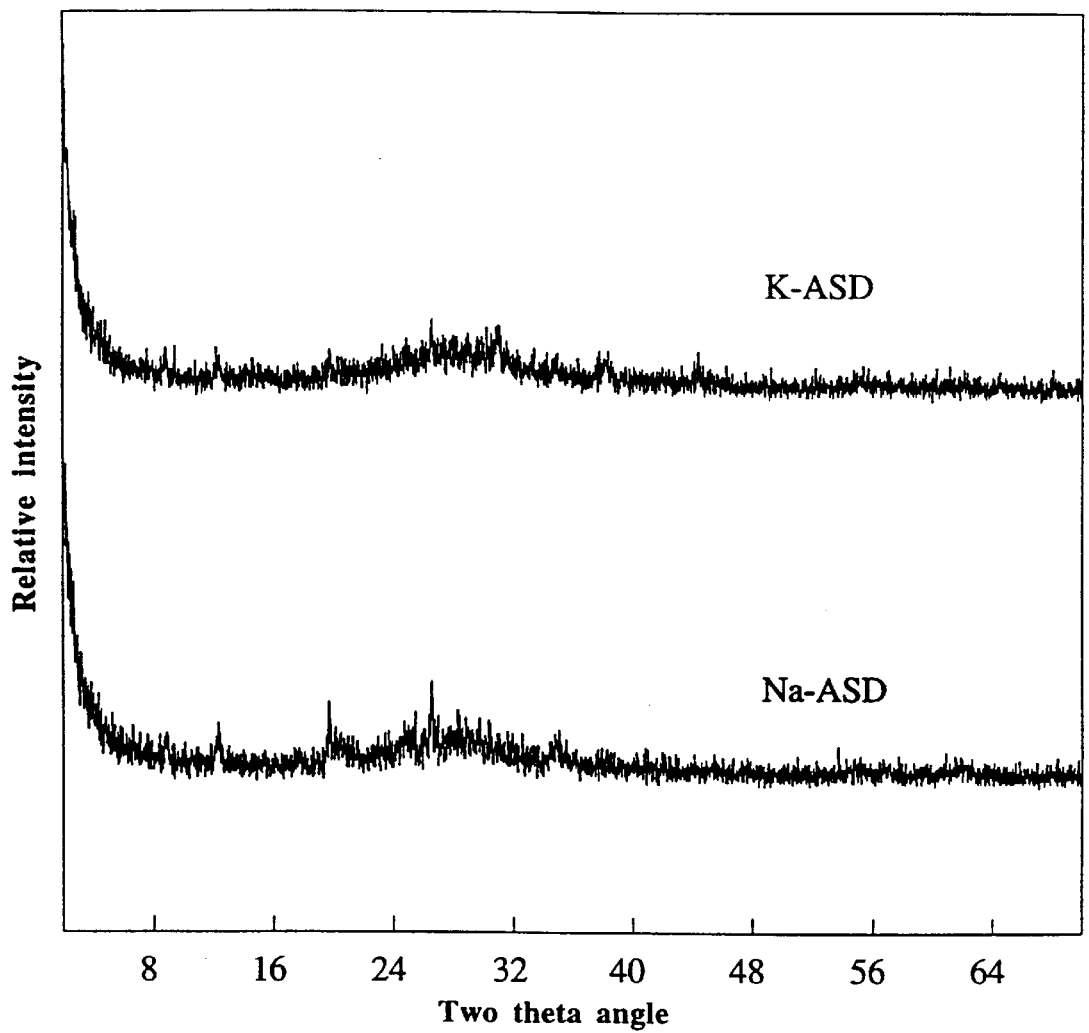
FIG. 15 Powder XRD trace for (a) K-ASD material formed by reaction with KF (Example 4) and (b) Na-ASD material formed by exchange in a concentrated NaOH solution (Example 13).

Table 8 summarises the data collected on both the original KAD materials (KCM4 and KSWD1) and the $M_e$-ASD materials—designated as $KCM_4$-Na and KSWD1-Na, respectively. Electron microprobe analyses allow the calculation of cation exchange capacities (CEC's) using the $K_2O$ and $Na_2O$ contents and assuming that all the available alkali ion occupies exchangeable sites. Comparison of the values shown in Table 8 for the Na-ASD with respect to the KAD suggests that a small percentage of the analysed potassium may be present as an impurity phase. Nevertheless, the high values calculated for CEC are indicative of materials which have great significance for commercial use as cation exchangers. Experimentally-determined values for CEC (using the method of Example 10 above) are also given for these samples in Table 8. In addition, the amount of $Cu^{+2}$ removed from solution is higher in the case of the Na-ASD material—by approximately 10–12% relative to the K-ASD material. This improvement in $Cu^{+2}$ exchange is presumably due to the lower affinity of Na for the exchange site in the alumino-silicate derivative. Powder XRD patterns of the KAD and the Na-ASD (FIG. 15) show that the essential short-range ordered structure remains in the alumino-silicate derivative and, coincidentally, that minor levels of impurity phases (e.g. containing $F^-$ and/or $K^+$; see electron microprobe analyses in Table 8) are also removed from the material.

Example 14

Uptake of Metal Cations in Low Concentrations from Solutions 30 mls of 0.005 N solution of a given element (typical examples are given in Table 9) is mixed with 0.075 g of M-ASD in a centrifuge tube. The suspension is allowed to equilibrate for 16 hours on a rotary shaker after which the suspension is centrifuged and the supernatant is analysed for remaining concentration of metal cation. The amount of element taken up by the M-ASD is calculated from the difference in concentrations of the given element before and after equilibrium. In Table 9 this uptake is expressed as milli-equivalents per 100 g of material. Table 9 gives data for the following elements at 0.005 N: Cu, Ni, Zn, Ag, Co, La, Cd, V, Hg, Fe, and Mn. Data for 0.01 N Ca and Li are also given in this Table.

Example 15

Figure 16:
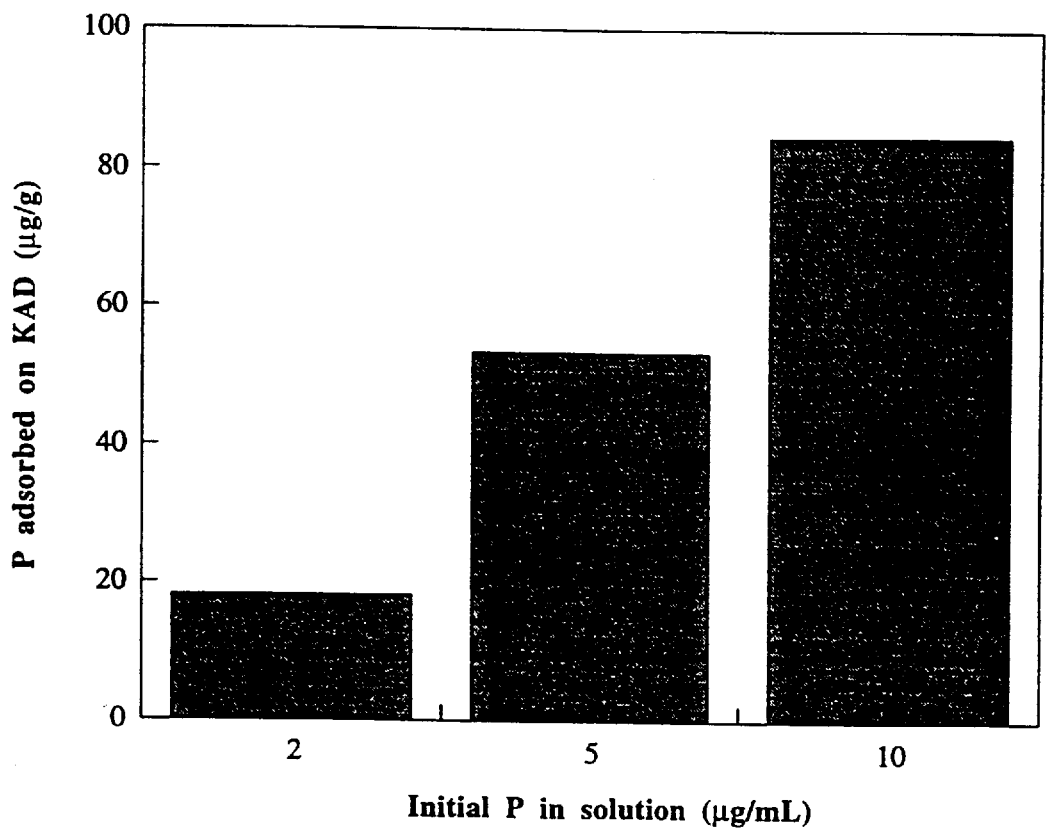
FIG. 16 Histograms showing amount of phosphorous adsorbed at various initial P concentrations in the solution. The amount of P adsorbed increases with increase in P concentration in the solution.

Uptake of Phosphate Ions from Solution 1.5 g of M-ASD was shaken with 30 ml of 0.01 M $CaCl_2$ solution containing Ca $(H_2PO_4)_2$ at an initial P concentration of 200 ppm. The samples were allowed to equilibrate on a shaker for 17 hours. After equilibration, the samples were centrifuged and supernatant was analysed for residual P by ICP. The amount of P adsorbed was calculated by subtracting the residual concentration from initial concentration. This procedure of P adsorption was also used for Ca $(HPO_4)$ at 10 ppm concentration in 0.01M $CaCl_2$. The amount of P adsorbed for selected samples is given in Table 10. Similar experiments on P uptake from solutions with lower initial concentrations on P are shown in FIG. 16. The amount of P adsorbed by M-ASD depends on the initial starting concentrations.

Example 16

Absorption of Oil 4 drops of boiled linseed oil from a burette were added onto 5 g of sample in the centre of a glass plate. While adding the oil, four drops at a time, the sample was kneaded using a pallet knife. Addition of oil and kneading procedure was carried out until the sample turned into a hard, putty-like lump. After this point, oil was added drop by drop. After each addition of oil, the mass was kneaded and the point at which one drop created a sample capable of being wound around the pallet knife in a spiral was noted down. If this was not possible, the point just before the sample became soft with one additional drop of boiled linseed oil was considered as the end point. The oil added to the sample until end point was considered as absorbed. The data expressed as amount absorbed per 100 g of sample is given in Table 11.

TABLES

TABLE 1

Averaged microprobe analyses for derivatives of montmorillonites.

| Element wt % oxide | STx-1 Derivative | SWy-1 Derivative |
|---|---|---|
| $Na_2O$ | 0.03 | 0.26 |
| $K_2O$ | 10.47 | 7.69 |
| MgO | 5.07 | 3.15 |
| CaO | 2.47 | 1.26 |
| $Al_2O_3$ | 20.37 | 21.43 |
| $SiO_2$ | 49.72 | 49.15 |
| $Fe_2O_3$ | 0.84 | 3.75 |
| Total | 88.94 | 86.43 |

TABLE 2

Averaged microprobe analyses for derivatives of kaolinite

| Element wt % oxide | KCM-16 | SC3-7 | SC0.5-9 | KCM-17 |
|---|---|---|---|---|
| $Na_2O$ | 13.06 | 0.11 | 0.13 | 0.58 |
| $K_2O$ | 0.51 | 18.54 | 19.78 | 13.49 |
| $Al_2O_3$ | 32.90 | 33.13 | 29.78 | 32.09 |
| $SiO_2$ | 42.25 | 44.87 | 39.86 | 42.86 |
| $Fe_2O_3$ | 0.89 | 0.85 | 0.75 | 0.97 |
| Total | 89.61 | 97.5 | 90.28 | 89.99 |

TABLE 3

Surface area for Cu-ASD materials

| Sample No. | Surface area $m^2/g$ |
|---|---|
| Cu-KCM-3C | 114 |
| Cu-KCM-17 | 130 |
| Cu-KCM-18 | 155 |
| Cu-KCM-19 | 146 |
| Cu-KCM-21 | 211 |

TABLE 4

Process conditions and properties of products obtained

| PCT Example No. | Sample No. | Type Reaction | Temp. | Time (hrs) | Product | CEC ($NH_4$) (meq/100 g) | Copper* ppm | SA $m^2/g$ |
|---|---|---|---|---|---|---|---|---|
| Eg. 1 | STx-4 | Ca – Mont + KOH | 80 | 3 | K-ASD | 280 | 87 | 54 |
| Eg. 2 | SWy-2 | Na – Mont – KOH | 80 | 3 | K-ASD | 133 | 53 | 43 |
| Eg. 3 | STx-3 | Ca – Mont + KOH | 80 | 3 | K-ASD | 300 | 57 | 25 |
| Eg. 4 | ZEO-2 | Zeolite + NaOH | 80 | 3 | Na-ASD | 151 | 74 | nd |

TABLE 4-continued

Process conditions and properties of products obtained

| PCT Example No. | Sample No. | Type Reaction | Temp. | Time (hrs) | Product | CEC (NH$_4$) (meq/ 100 g) | Copper* ppm | SA m$^2$/g |
|---|---|---|---|---|---|---|---|---|
| Eg. 5 | KCM16 | Kaolin + NaOH | 80 | 3 | Na-ASD | 395 | 46 | 17 |
| Eg. 6 | TIG | Kaolin + KOH | 80 | 4 | K-ASD | 246 | nd | 195 |
| Eg. 7 | OHK-8B | Kaolin + KOH + KCl | 80 | 16 | K-ASD | 362 | nd | 26 |
| Eg. 8 | KLi-5 | Kaolin + LiOH | 80 | 16 | Li-ASD | 79 | nd | 31 |
|  | SC0.5-9 | Kaolin + KOH | 80 | 4 | K-ASD | 317 | nd | 121 |
|  | SC3-7 | Kaolin + KOH + KCl | 80 | 16 | K-ASD | 240 | nd | 40 |
|  | SC0.5-13 | Kaolin + KOH + KCl | 80 | 17 | K-ASD | 211 | nd | 182 |
|  | SC3-8 | Kaolin + KOH + KCl | 80 | 16 | K-ASD | 359 | nd | 33 | nd not determined
*Cu concentration in ppm remaining in solution from an initial value of 20 ppm. See Example 9.

TABLE 5

Properties of M-ASD obtained by varying the conditions af the process

| Kaolin/ KOH ratio | 20 mls of H$_2$O | | | 10 mls of H$_2$O | | |
|---|---|---|---|---|---|---|
|  | CEC (NH$_4^+$) | SA (m$^2$/g) | Consistency | CEC (NH$_4^+$) | SA (m$^2$/g) | Con- sistency |
| 3.6 | 463 | 21 | suspension | 185 | 125 | paste |
| 5.4 | 184 | 124 | paste | 208 | 44 | paste |

TABLE 6

Properties of starting materials used in various Examples

|  | CEC (meq/100 g NH$_4$) | SA (m$^2$/g) | CU$^{+2}$* | Oil Absorption (ml/100 g) |
|---|---|---|---|---|
| KGa-1 Kaolin | ~10 | 6 | ~190 | 32 |
| KCM Kaolin | 15 | 24 | ~190 | 58 |
| STx-1 Ca-Mont | 60 | 84 | 164 | 60 |
| SWy-1 Na-Mont | 96 | 32 | 148 | 44 |
| Zeolin 1 | 98 | ~15 | 140 | 24 |

TABLE 7

CEC of a range of samples for 1 molar strength of monovalent cations

|  | CEC (meq/100 g) | | |
|---|---|---|---|
| Sample No. | NH4 | Na | Li |
| SC3-7 (Example 7) | 240 | 510 | 721 |
| SC0.5-9 (Example 6) | 317 | 571 | 888 |
| STXVC-1A (Example 1) | 131 | 272 | nd |
| STXVC-2A (Example 1) | 142 | nd | 414 | nd not determined

TABLE 8

Averaged microprobe analyses for original K-ASD and its exchanged derivative Na-ASD

| Element wt % oxide | KWSD1-K | KWSD1-Na | KCM4-K | KCM4-Na |
|---|---|---|---|---|
| F | 5.65 | — | 4.87 | 0.20 |
| Na$_2$O | 0.85 | 7.92 | 0.87 | 10.00 |
| K$_2$O | 19.78 | 5.34 | 21.10 | 2.64 |
| Al$_2$O$_3$ | 28.33 | 28.634 | 26.47 | 28.15 |
| SiO$_2$ | 42.12 | 46.46 | 40.97 | 47.42 |
| Fe$_2$O$_3$ | 2.09 | 2.21 | 1.02 | 1.52 |
| Total | 98.47 | 90.57 | 95.3 | 89.93 |
| CEC (calc) | 420 | 369 | 447 | 378 |
| CU* | 63 | 46 | 51 | 36 |
| CEC(NH$_4^+$) | 224 | 216 | 241 | 241 |

*Cu concentration in ppm remaining in solution from an initial value of 20 ppm. See Example 9.

TABLE 9

Uptake of elements out of dilute solutions of various elements

| Sample No. | Uptake of elements expressed as meq/100 g | | | | | | | | | | | | | |
|---|---|---|---|---|---|---|---|---|---|---|---|---|---|---|
| | 0.005 Normal solution | | | | | | | | | | | | 0.01 normal solution | |
| | Cd | V | Hg | Cr | Fe | Mn | Cu | Ni | Zn | Ag | Co | La | Ca | Li |
| SC3-7 | 173 | 117 | 88 | 198 | 189 | 150 | 208 | 162 | 191 | 186 | 179 | 171 | 215 | 145 |
| SC0.5-9 | 169 | 152 | 81 | 198 | 188 | 132 | 212 | 166 | 188 | 190 | 164 | 126 | 170 | 61 |
| STx-2 | 159 | 80 | 52 | 198 | 190 | 181 | 181 | 126 | 172 | 190 | 127 | 160 | nd | nd |
| SWy-2 | 120 | 59 | 37 | 198 | 189 | 101 | 200 | 120 | 168 | 135 | 130 | 154 | nd | nd | nd not determined

TABLE 10

The phosphate sorption capacity of selected samples

| Sample No. | P adsorbed on solid from 200 ppm P as $H_2PO_4^-$ (μg/g) | P adsorbed on solid from 10 ppm P as $HPO_4^{-2}$ (μg/g) |
|---|---|---|
| SC3-5 | 1330 | 38 |
| SC3-7 | 450 | 31 |
| SC0.5-9 | 2796 | 85 |

TABLE 11

Oil absorption capacity for selected M-ASD materials

| Sample Number | Oil Absorption Capacity (ml/100 g) |
|---|---|
| SC3-7 (Kaolin + KOH + KCl) | 90 |
| SC0.5-9 (Kaolin + KOH) | 99 |
| SC0.5-13 (Kaolin + KOH + KCl) | 119 |
| SC0.5-14 (Kaolin + KOH) | 103 |

What is claimed is:

1. A process for the preparation of an amorphous alumino-silicate derivative, said amorphous alumino-silicate derivative having the general formula $$M_p Al_q Si_2 O_r (OH)_s \cdot u H_2 O$$

wherein $0.2 \leq p \leq 2.0$, $0.5 \leq q \leq 2.5$, $4.0 \leq r \leq 12$, $0.5 \leq s \leq 4.0$, and $0.0 \leq u \leq 6.0$, and wherein M is an ammoniumium or an alkali metal cation; said process comprising mixing a solid alumino-silicate starting material with a solid alkali metal hydroxide or ammonium hydroxide to form a solution having a molar excess of alkali metal hydroxide or ammonium hydroxide, and heating to form the amorphous alumino-silicate derivative.

2. The process according to claim 1, further comprising adding an additional reactant, MX, to the solution, where M is the ammonium ion or the alkali metal cation and X is a halide, to form an amorphous alumino-silicate derivative having a composition of general formula $$M_p Al_q Si_2 O_r (OH)_s X_t \cdot u H_2 O$$

wherein $0.2 \leq p \leq 2.0$, $0.5 \leq q \leq 2.5$, $4.0 \leq r \leq 12$, $0.5 \leq s \leq 4.0$, $0.0 \leq t \leq 1.0$ and $0.0 \leq u \leq 6.0$.

3. The process according to claim 2, further comprising drying the amorphous alumino-silicate derivative, and subjecting the amorphous alumino-silicate derivative to X-ray diffraction analysis to confirm the presence of a broad X-ray diffraction hump between 22° and 32° 2θ using CuKα radiation and that tetrahedrally coordinated aluminum is present.

4. The process according to claim 3, further comprising washing the amorphous alumino-silicate derivative with an acid to remove impurities.

5. The process according to claim 1, further comprising drying the amorphous alumino-silicate derivative, and subjecting the amorphous alumino-silicate derivative to X-ray diffraction analysis to confirm the presence of a broad X-ray diffraction hump between 22° and 32° 2θ using CuKα radiation and that tetrahedrally coordinated aluminum is present.

6. The process according to claim 5, further comprising washing the amorphous alumino-silicate derivative with an acid to remove impurities.

7. The process according to claim 1, further comprising at least partly exchanging M with an ion selected from the group consisting of $Mg^{2+}$, $Ca^{2+}$, $Sr^{2+}$, $Ba^{2+}$, $Cr^{3+}$, $Mn^{2+}$, $Co^{2+}$, $Ni^{2+}$, $Cu^{2+}$, $Zn^{2+}$, $Ag^+$, $Cd^{2+}$, $Pb^{2+}$, $Hg^{2+}$, $La^{3+}$, $Nd^{3+}$ and $UO_2^{2+}$.

8. The process according to claim 7, wherein M is selected from the group consisting of $NH_4^+$, $Na^+$, $K^+$, $Li^+$, $Rb^+$ and $Cs^+$, and M is at least partly exchanged with ion selected from the group consisting of $Pb^{2+}$, $Cu^{2+}$, $Cd^{2+}$, $Ni^{2+}$, $Co^{2+}$, $Cr^{3+}$, $Sr^{2+}$, $Zn^{2+}$, $Nd^{3+}$ and $UO_2^{2+}$.

9. The process according to claim 1, wherein the alumino-silicate starting material is selected from the group consisting of a montmorillonite, a kaolin, a natural zeolite, an illite, a palygorskite and a saponite.

10. The process according to claim 9, wherein the alumino-silicate starting material is a natural zeolite selected from the group consisting of clinoptilolite and heulandite.

11. The process according to claim 1, wherein the heating occurs at a reaction temperature of 200° C. or less.

12. The process according to claim 1, wherein the heating occurs at a reaction temperature of 50° C. to 200° C.

13. The process according to claim 1, wherein the heating occurs for a reaction time of one minute to 100 hours.

14. The process according to claim 1, wherein the heating occurs for a reaction time of less than 24 hours.

* * * * *